US012645253B2

(12) United States Patent
Park et al.

(10) Patent No.: US 12,645,253 B2
(45) Date of Patent: Jun. 2, 2026

(54) DISPLAY APPARATUS AND METHOD OF MANUFACTURING THE SAME

(71) Applicant: SAMSUNG DISPLAY CO., LTD., Yongin-si (KR)

(72) Inventors: Youngmin Park, Yongin-si (KR); Suchang Ryu, Yongin-si (KR); Dohun Kim, Yongin-si (KR); Sojeong La, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 142 days.

(21) Appl. No.: 18/223,740

(22) Filed: Jul. 19, 2023

(65) Prior Publication Data

US 2024/0111329 A1     Apr. 4, 2024

(51) Int. Cl.
*G06F 1/16*          (2006.01)
*H04M 1/02*          (2006.01)

(52) U.S. Cl.
CPC ........ *G06F 1/1616* (2013.01); *H04M 1/0216* (2013.01)

(58) Field of Classification Search
CPC ........................... G06F 1/1616; H04M 1/0216
See application file for complete search history.

(56) References Cited

U.S. PATENT DOCUMENTS

2016/0014881 A1 *   1/2016   Shin ..................... G06F 1/1616
                                                    361/749
2017/0142847 A1 *   5/2017   Park ..................... G06F 1/1652

2018/0110139 A1 *   4/2018   Seo ............................ E05D 1/04
2021/0122669 A1     4/2021   Lee et al.
2021/0367189 A1    11/2021   Hwang et al.
2022/0022334 A1     1/2022   Kang et al.
2022/0106218 A1 *   4/2022   Cao ........................... C03C 15/00
2022/0174823 A1 *   6/2022   Kim .................... H04M 1/0216
2022/0256018 A1 *   8/2022   Kim .................... H04M 1/0268

FOREIGN PATENT DOCUMENTS

| | | | |
|---|---|---|---|
| JP | 2019120939 A * | 7/2019 | .......... G06F 1/1641 |
| KR | 10-2021-0048614 | 5/2021 | |
| KR | 10-2261882 | 6/2021 | |
| KR | 10-2021-0144974 | 12/2021 | |
| KR | 10-2022-0010629 | 1/2022 | |
| KR | 10-2372189 | 3/2022 | |
| KR | 10-2022-0115705 A | 8/2022 | |
| KR | 102579750 B1 * | 9/2023 | .......... H10K 59/873 |

* cited by examiner

*Primary Examiner* — Travis M Figg
(74) *Attorney, Agent, or Firm* — F. CHAU & ASSOCIATES, LLC

(57)          ABSTRACT

A display apparatus includes a display panel including a display element. An upper organic layer is disposed over the display panel and includes a first non-folding portion and a second non-folding portion spaced apart from each other in a first direction. A first foldable portion is disposed between the first non-folding portion and the second non-folding portion and extends in a second direction intersecting the first direction. The first foldable portion has a thickness greater than a thickness of the first and second non-folding portions. A plurality of second foldable portions is disposed on both sides of the first foldable portion and extends in the second direction. The plurality of second foldable portions has a thickness less than a thickness of the first non-folding portion.

14 Claims, 22 Drawing Sheets

IRRADIATION OF
ULTRAVIOLET RAYS

DISPLAY APPARATUS AND METHOD OF MANUFACTURING THE SAME

CROSS-REFERENCE TO RELATED APPLICATION

This application claims priority under 35 U.S.C. § 119 to Korean Patent Application No. 10-2022-0125794, filed on Sep. 30, 2022 in the Korean Intellectual Property Office, the disclosure of which is incorporated by reference in its entirety herein.

1. TECHNICAL FIELD

One or more embodiments relate to a display apparatus, and more particularly, to a display apparatus for increasing a flatness of a display surface.

2. DISCUSSION OF RELATED ART

Display apparatuses may be applied to various electronic devices. For example, a display apparatus may be applied to a mobile electronic device such as a smartphone. The electronic device may be a foldable electronic device in which a part of a display surface may be folded to increase the area of the display surface while reducing an overall size. However, a foldable electronic device may have a display surface that is not flat after it is folded and then unfolded.

SUMMARY

One or more embodiments include a display apparatus for increasing a flatness of a display surface. However, embodiments are examples, and embodiments of the present disclosure are not necessarily limited thereto.

Additional aspects will be set forth in part in the description which follows and, in part, will be apparent from the description, or may be learned by practice of the presented embodiments.

According to an embodiment, a display apparatus includes a display panel comprising a display element. An upper organic layer is disposed over the display panel. The upper organic layer comprises a first organic layer and a second organic layer interposed between the first organic layer and the display panel. The upper organic layer comprises a first non-folding portion and a second non-folding portion that are spaced apart from each other in a first direction. A first foldable portion is disposed between the first non-folding portion and the second non-folding portion. The first foldable portion extends in a second direction intersecting the first direction. The first foldable portion has a thickness greater than thicknesses of the first and second non-folding portions. A plurality of second foldable portions is disposed on both sides of the first foldable portion. Each of the plurality of second foldable portions extends in the second direction, and has a thickness less than the thicknesses of the first and second non-folding portions.

In an embodiment, a thickness of the first foldable portion may increase away from an outer portion of the first foldable portion towards a central portion of the first foldable portion, and a thickness of each of the plurality of second foldable portions may decrease away from an outer portion of the second foldable portion towards a central portion of the second foldable portion.

In an embodiment, a thickness of the first foldable portion may increase away from each of the plurality of second foldable portions. A thickness of a portion of the second foldable portion may decrease away from the first foldable portion. A thickness of a first portion of the plurality of second foldable portions positioned between the first foldable portion and the first non-folding portion decreases away from the first non-folding portion. A thickness of a second portion of the plurality of second foldable portions positioned between the first foldable portion and the second non-folding portion may decrease away from the second non-folding portion.

In an embodiment, the first non-folding portion may include a 1-$1^{st}$ non-folding portion that is a portion of the first organic layer and a 2-$1^{st}$ non-folding portion that is a part of the second organic layer. The second non-folding portion may include a 1-$2^{nd}$ non-folding portion that is a portion of the first organic layer and a 2-$2^{nd}$ non-folding portion that is a portion of the second organic layer. The first foldable portion may include a 1-$1^{st}$ foldable portion that is a portion of the first organic layer and a 2-$1^{st}$ foldable portion that is a portion of the second organic layer. Each of the plurality of second foldable portions may include a 1-$2^{nd}$ foldable portion that is a portion of the first organic layer and a 2-$2^{nd}$ foldable portion that is a portion of the second organic layer.

In an embodiment, the second organic layer may have a uniform thickness. A thickness of the 1-$1^{st}$ foldable portion is greater than a thickness of the 1-$1^{st}$ non-folding portion. A thickness of the 1-$2^{nd}$ foldable portion is less than a thickness of the 1-$1^{st}$ non-folding portion.

In an embodiment, a thickness of the 1-$1^{st}$ foldable portion may increase away from an outer portion of the 1-$1^{st}$ foldable portion towards a central portion of the 1-1st foldable portion. A thickness of the 1-$2^{nd}$ foldable portion may decrease away from an outer portion of the 1-$2^{nd}$ foldable portion towards a central portion of the 1-$2^{nd}$ foldable portion.

In an embodiment, a thickness of the 1-$1^{st}$ foldable portion may increase away from the 1-$2^{nd}$ foldable portion. A thickness of a portion of the 1-$2^{nd}$ foldable portion may decrease away from the 1-$1^{st}$ foldable portion. A thickness of a first portion of the 1-$2^{nd}$ foldable portion positioned between the 1-$1^{st}$ non-folding portion and the 1-1st foldable portion may decrease away from the 1-$1^{st}$ non-folding portion. A thickness of a second portion of the 1-$2^{nd}$ foldable portion positioned between the 1-$2^{nd}$ non-folding portion and the 1-$1^{st}$ foldable portion may decrease away from the 1-$2^{nd}$ non-folding portion.

In an embodiment, the first organic layer may have a uniform thickness. A thickness of the 2-$1^{st}$ foldable portion is greater than a thickness of the 2-$1^{st}$ non-folding portion. A thickness of the 2-$2^{nd}$ foldable portion is less than thicknesses of the 2-$1^{st}$ non-folding portion and the 2-$2^{nd}$ non-folding portion.

In an embodiment, a thickness of the 2-$1^{st}$ foldable portion may increase from an outer portion of the 2-$1^{st}$ foldable portion towards a central portion of the 2-$1^{st}$ foldable portion. A thickness of the 2-$2^{nd}$ foldable portion may decrease away from an outer portion of the 2-$2^{nd}$ foldable portion towards a central portion of the 2-$2^{nd}$ foldable portion.

In an embodiment, a thickness of the 2-$1^{st}$ foldable portion may increase away from the 2-$2^{nd}$ foldable portion. A thickness of a portion of the 2-2" d foldable portion may decrease away from the 2-$1^{st}$ foldable portion. A thickness of a first portion of the 2-$2^{nd}$ positioned between the 2-$1^{st}$ foldable portion and the 2-$1^{st}$ non-folding portion may decrease away from the 2-$1^{st}$ non-folding portion. A thickness of a second portion of the 2-$2^{nd}$ foldable portion positioned between the 2-1$^{st}$ foldable portion and the 2-2$^{nd}$ non-folding portion may decrease away from the 2-2$^{nd}$ non-folding portion.

In an embodiment, a first sum of a thickness of the 1-1$^{st}$ foldable portion and a thickness of the 2-1$^{st}$ foldable portion may be greater than a second sum of a thickness of the 1-1$^{st}$ non-folding portion and a thickness of the 2-1$^{st}$ non-folding portion. A third sum of a thickness of the 1-2$^{nd}$ foldable portion and a thickness of the 2-2 n foldable portion may be less than the second sum.

In an embodiment, the first organic layer may have a modulus higher than a modulus of the second organic layer.

In an embodiment, the modulus of the first organic layer may be greater than or equal to about 1 GPa and less than about 10 GPa. The modulus of the second organic layer may be greater than or equal to about 0.1 GPa and less than about 1 GPa.

According to an embodiment, a method of manufacturing a display apparatus includes preparing a display panel comprising a display element. An upper organic layer is formed that comprises a first organic layer and a second organic layer on the display panel. The upper organic layer comprises a first non-folding portion and a second non-folding portion that are spaced apart from each other in a first direction. A first foldable portion is disposed between the first non-folding portion and the second non-folding portion. The first foldable portion extends in a second direction intersecting the first direction. The first foldable portion has a thickness greater than thicknesses of the first and second non-folding portions. A plurality of second foldable portions is disposed on both sides of the first foldable portion. Each of the plurality of second foldable portions extends in the second direction and has a thickness less than the thicknesses of the first and second non-folding portions.

In an embodiment, a forming of the upper organic layer may include applying a second organic layer composition to the display panel, forming the second organic layer by irradiating ultraviolet rays to the second organic layer composition, applying a first organic layer composition to the second organic layer, and forming the first organic layer by irradiating ultraviolet rays to the first organic layer composition while pressing the first organic layer composition by using a jig.

In an embodiment, a bottom surface of the jig may be non-adhesive.

In an embodiment, a top surface of the first organic layer has a shape engaged with a bottom surface of the jig.

In an embodiment, a forming of the upper organic layer may include applying a second organic layer composition to the display panel, forming the second organic layer by irradiating ultraviolet rays to the second organic layer composition while pressing the second organic layer composition by using a jig, applying a first organic layer composition to the second organic layer, and forming the first organic layer by irradiating ultraviolet rays to the first organic layer composition.

In an embodiment, a bottom surface of the jig may be non-adhesive.

In an embodiment, a top surface of the second organic layer has a shape engaged with a bottom surface of the jig.

Other aspects, features, and advantages of the disclosure will become more apparent from the detailed description, the claims, and the drawings.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION OF EMBODIMENTS

Figure 1:
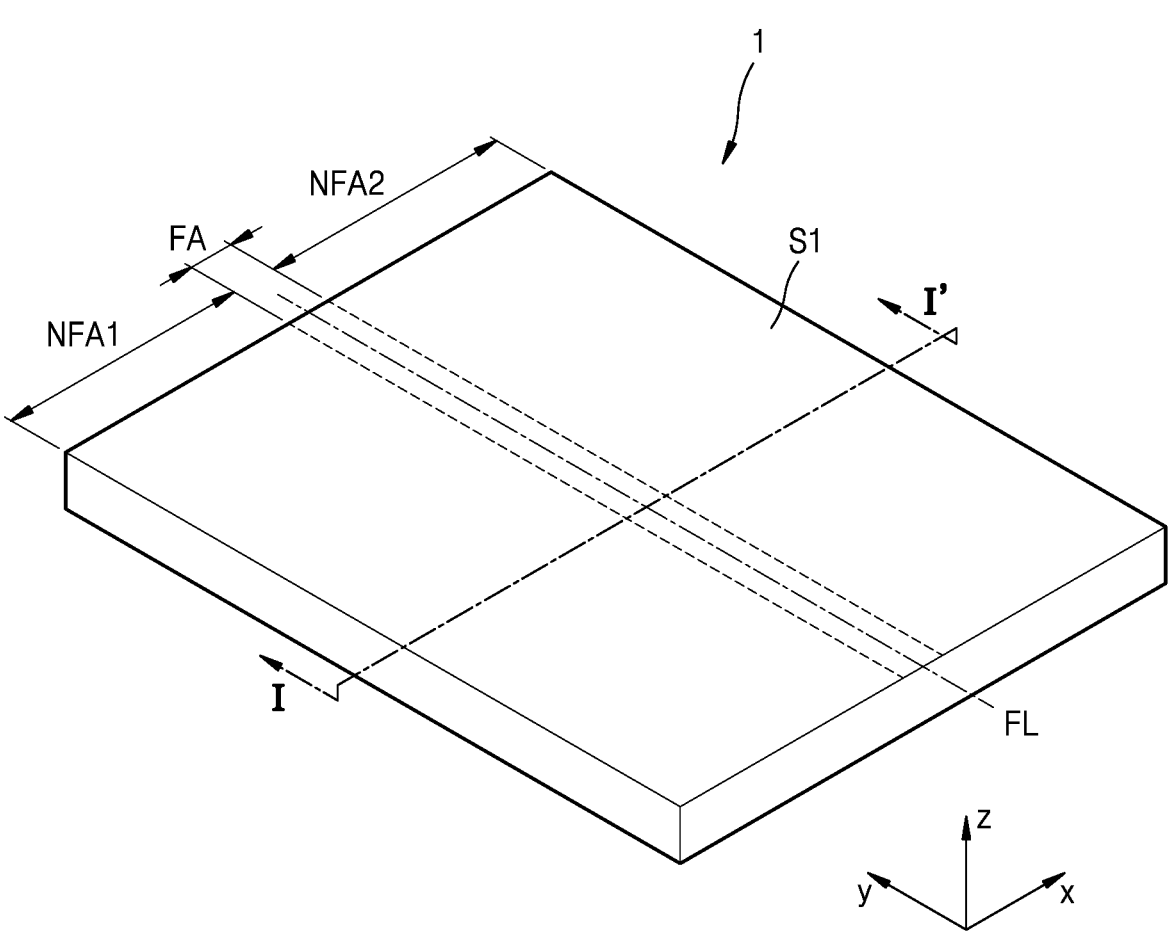
FIG. 1 is a perspective view schematically illustrating a display apparatus, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, embodiments of the present disclosure are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, certain embodiments will be illustrated in the drawings and described in the detailed description. Effects and features of the disclosure, and methods for achieving them will be clarified with reference to embodiments described below in detail with reference to the drawings. However, the present disclosure is not necessarily limited to the following embodiments and may be embodied in various forms.

Hereinafter, embodiments will be described in detail with reference to the accompanying drawings, wherein the same or corresponding elements are denoted by the same reference numerals throughout and a repeated description thereof may be omitted for economy of description.

It will be understood that when a component, such as a layer, a film, a region, or a plate, is referred to as being "on" another component, the component may be directly on the other component or intervening components may be present therebetween. When a component, such as a layer, a film, a region, or a plate, is referred to as being "directly on" another component, no intervening components may be present therebetween. Also, sizes of components in the drawings may be exaggerated or contracted for convenience of explanation. For example, sizes and thicknesses of elements in the drawings may be arbitrarily illustrated for convenience of explanation, and embodiments of the present disclosure are not necessarily limited thereto.

In the following embodiments, the x-axis, the y-axis and the z-axis are not necessarily limited to three axes of the rectangular coordinate system, and may be interpreted in a broader sense. For example, the x-axis, the y-axis, and the z-axis may be perpendicular to one another, or may represent different directions that cross each other but are not perpendicular to one another.

Although the terms "first," "second," etc. may be used to describe various elements, these elements should not be limited by these terms. These terms are only used to distinguish one element from another.

As used herein, the singular forms "a," "an," and "the" are intended to include the plural forms as wed, unless the context clearly indicates otherwise.

It will be further understood that the terms "comprises" or "comprising" used herein specify the presence of stated features or components, but do not preclude the presence or addition of one or more other features or components.

"A and/or B" is used herein to select only A, select only B, or select both A and B. "At least one of A and B" is used to select only A, select only B, or select both A and B.

Figure 2:
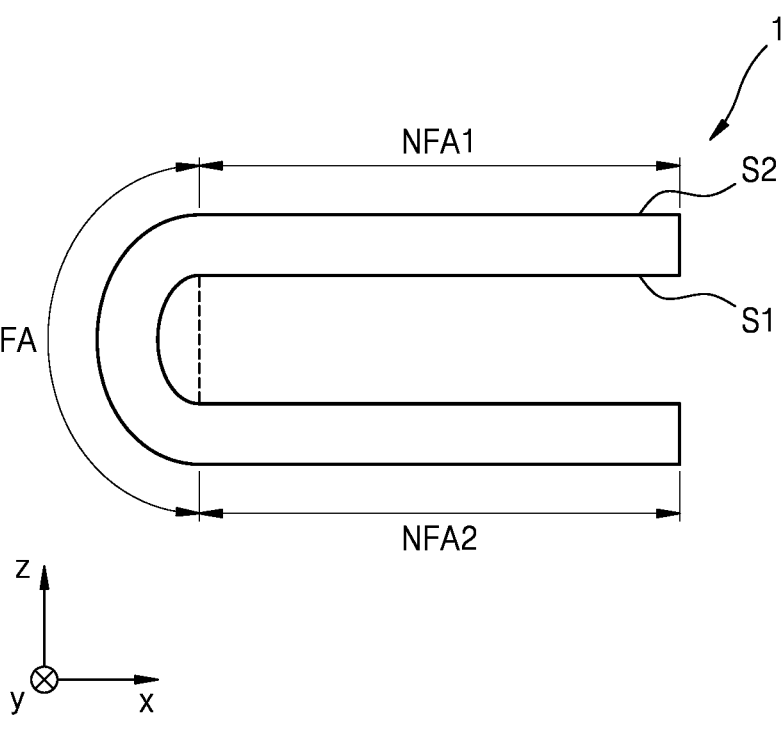
FIG. 2 is a cross-sectional view schematically illustrating the display apparatus, according to an embodiment.

FIG. 1 is a perspective view schematically illustrating a display apparatus 1, according to an embodiment. FIG. 2 is a cross-sectional view schematically illustrating the display apparatus 1, according to an embodiment. In detail, FIG. 1 illustrates the display apparatus 1 before being folded (e.g., in an unfolded state). FIG. 2 illustrates the display apparatus 1 that is folded. The expression "before being folded" used herein means that the display apparatus 1 is not folded (e.g., in an unfolded state) and thus at least a portion of the display apparatus 1 is not deformed by folding.

In an embodiment, the display apparatus 1 may have a polygonal shape including a quadrangular shape. For example, the display apparatus 1 may have a rectangular shape in which a horizontal length is greater than a vertical length, a rectangular shape in which a horizontal length is less than a vertical length, or a square shape. Alternatively, the display apparatus 1 may have any of various shapes such as an elliptical shape or a circular shape. Although the display apparatus 1 has a rectangular shape in which a horizontal length is greater than a vertical length in FIG. 1, embodiments of the present disclosure are not necessarily limited thereto.

The display apparatus 1 may include a first surface S1 and a second surface S2 that is opposite to the first surface S1. The display apparatus 1 may display an image on the first surface S1 For example, the first surface S1 may include a display surface. In an embodiment, the first surface S1 may be a top surface of the display apparatus 1 (in a +z direction).

The second surface S2 may be a bottom surface of the display apparatus 1 (in a −z direction). In some embodiments, the display apparatus 1 may also display an image on the second surface S2.

The display apparatus 1 may be folded. For example, at least a portion of the display apparatus 1 may have flexibility, and as the portion having flexibility is bent, the display apparatus 1 may be folded. Accordingly, the display apparatus 1 may include a folded area and a non-folded area that is arranged on at least a side of the folded area and is not folded. The expression "non-folded" used herein means that a portion is not folded, and includes not only an embodiment in which a portion is hard with no flexibility, and thus is not capable of being folded but also a case where a portion has flexibility but is not folded. In an embodiment, the display apparatus 1 may display an image not only in the non-folded area but also in the folded area.

As shown in FIG. 1, in an embodiment the display apparatus 1 may include a first non-folding area NFA1, a second non-folding area NFA2, and a foldable area FA. However, embodiments of the present disclosure are not necessarily limited thereto and the number and arrangement of the non-folding area(s) and folding area(s) may vary. The first non-folding area NFA1 and the second non-folding area NFA2 may be non-folded areas, and the foldable area FA may have flexibility and may be a foldable area.

The foldable area FA may extend in a direction intersecting a virtual straight line that connects the first non-folding area NFA1 to the second non-folding area NFA2. For example, when the display apparatus 1 is in a state before being folded, the first non-folding area NFA1 and the second non-folding area NFA2 may be spaced apart from each other in a first direction (e.g., an x direction or a −x direction) and the virtual straight line may extend in the x or −x direction when the display apparatus 1 is in the unfolded state. The foldable area FA may be positioned between the first non-folding area NFA1 and the second non-folding area NFA2 (e.g., in the x or −x directions). For example, the first non-folding area NFA1 may be adjacent to a first lateral side of the foldable area FA, and the second non-folding area NFA2 may be adjacent to the opposite second lateral side of the foldable area FA. When the display apparatus 1 is in a state before being folded, the foldable area FA may extend in a second direction (e.g., a y direction or a −y direction) intersecting the first direction (e.g., an x direction or a −x direction).

A folding line FL may be provided in the foldable area FA in the second direction (e.g., the y direction or the −y direction) in which the foldable area FA extends. Accordingly, the display apparatus 1 may be folded in the foldable area FA. The foldable area FA and the folding line FL of the foldable area FA may overlap a portion of the display apparatus 1 where an image is displayed, and when the display apparatus 1 is folded, the portion where the image is displayed may be folded.

Although the first non-folding area NFA1 and the second non-folding area NFA2 have the same area or similar areas and the display apparatus 1 includes one foldable area FA in FIG. 1 for convenience of explanation, embodiments of the present disclosure is not necessarily limited thereto. For example, the first non-folding area NFA1 and the second non-folding area NFA2 may have different areas from each other. Also, the display apparatus 1 may include a plurality of foldable areas FA. In such embodiment, a plurality of non-folding areas may be spaced apart from each other, and each of the plurality of foldable areas FA may be disposed between the non-folding areas. Each foldable area FA may be folded along the folding line FL, and a plurality of folding lines FL may be provided.

Although the folding line FL passes through the center of the foldable area FA and the foldable area FA is line-symmetric with respect to the folding line FL in FIG. 1, embodiments of the present disclosure are not necessarily limited thereto. For example, in some embodiments the folding line FL may be asymmetrically provided in the foldable area FA.

As shown in FIG. 2, the display apparatus 1 may be folded so that the first surface S1 of the first non-folding area NFA1 and the first surface S1 of the second non-folding area NFA2 face each other along the folding line FL. For example, as the foldable area FA of the display apparatus 1 is bent, the first surface S1 of the first non-folding area NFA1 and the first surface S1 of the second non-folding area NFA2 may be located to face each other. Even when the display apparatus 1 is folded, the foldable area FA may extend in a direction intersecting a virtual straight line that connects the first non-folding area NFA1 to the second non-folding area NFA2. For example, when the display apparatus 1 is folded, the display apparatus 1 may extend in the second direction (e.g., the y direction or the −y direction) intersecting a virtual straight line (e.g., a straight line parallel to a z axis direction) that connects the first non-folding area NFA1 to the second non-folding area NFA2.

The foldable area FA may be bent and then may be unfolded again. Accordingly, the display apparatus 1 may be unfolded. The expression "unfolded" used herein means that the display apparatus 1 is folded and then unfolded. For example, the display apparatus 1 may be a foldable display apparatus.

The expression "folded" used herein means that a portion is not fixed in shape but is deformed from an original shape to another shape, and may be folded, curved or bent along at least one specific line, such as the folding line FL. Accordingly, although the display apparatus 1 shown in FIG. 2 is folded so that the first surface S1 of the first non-folding area NFA1 and the first surface S1 of the second non-folding area NFA2 are parallel to each other and face each other in FIG. 2, embodiments of the present disclosure are not necessarily limited thereto. For example, in some embodiments the display apparatus 1 may be folded so that the first surface S1 of the first non-folding area NFA1 and the first surface S1 of the second non-folding area NFA2 form a certain angle (e.g., an acute angle, a right angle, or an obtuse angle) with the foldable area FA therebetween.

Figure 3:
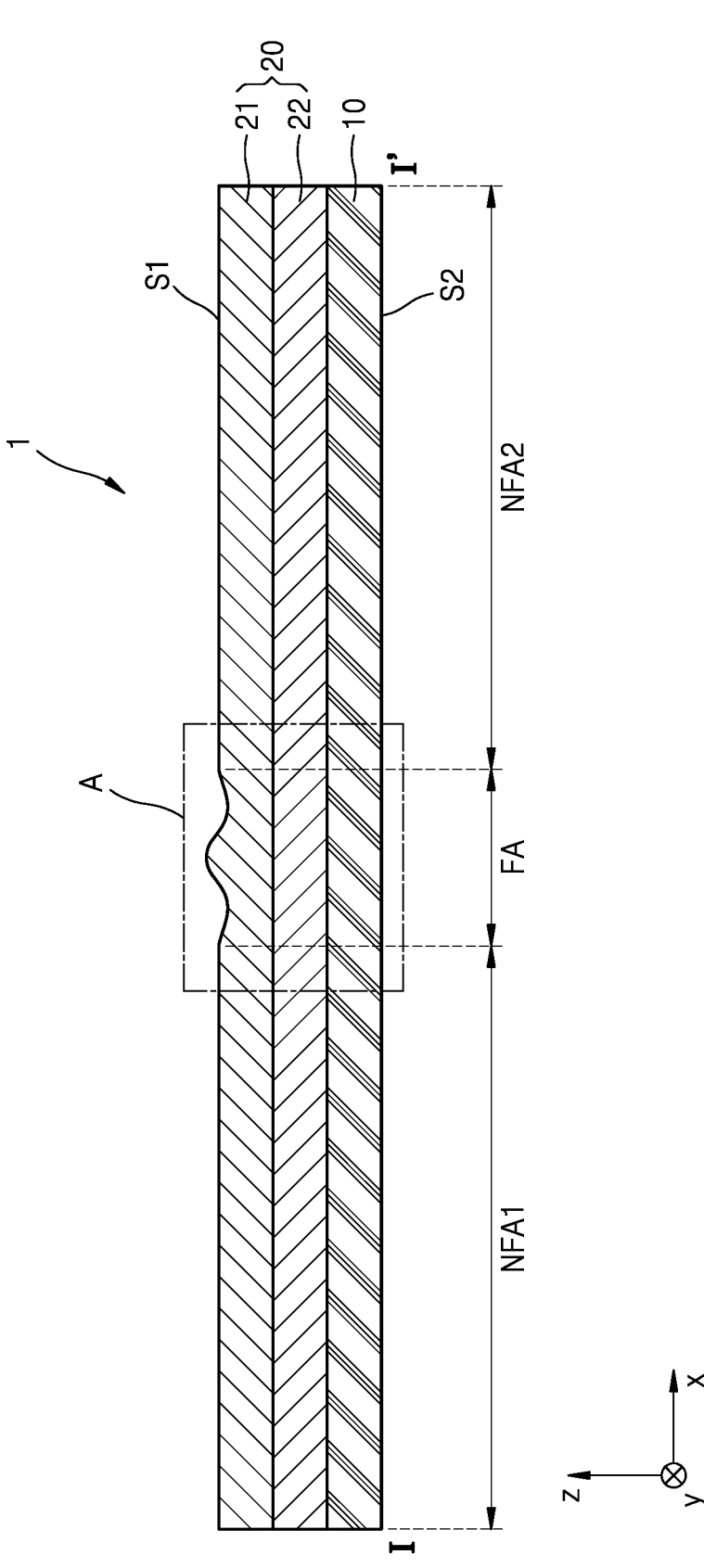
FIG. 3 is a cross-sectional view taken along line H' of the display apparatus of FIG. 1 according to an embodiment.
Figure 4A:
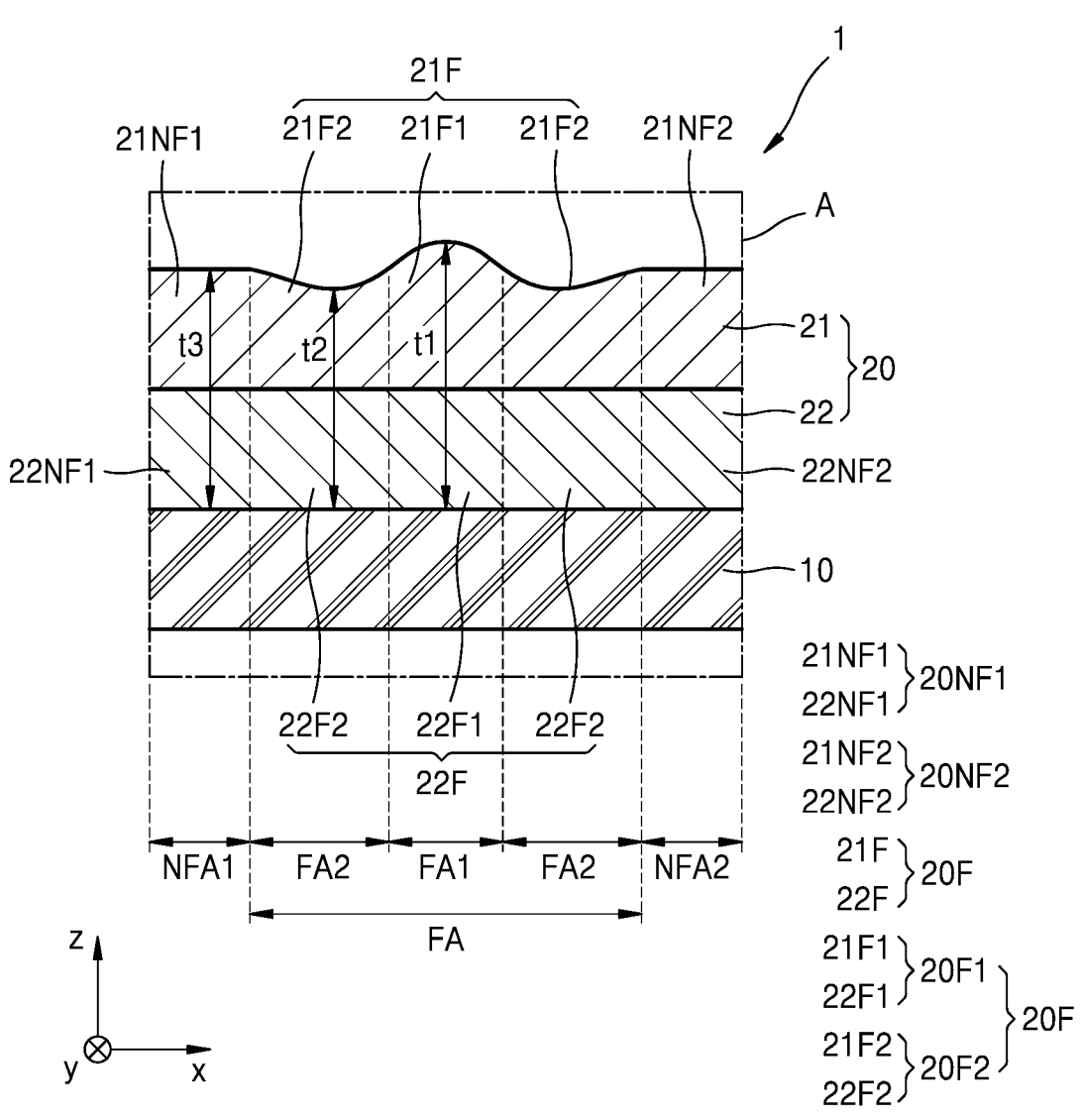
FIG. 4A is an enlarged cross-sectional view schematically illustrating a portion A of the display apparatus of FIG. 3.
Figure 4B:
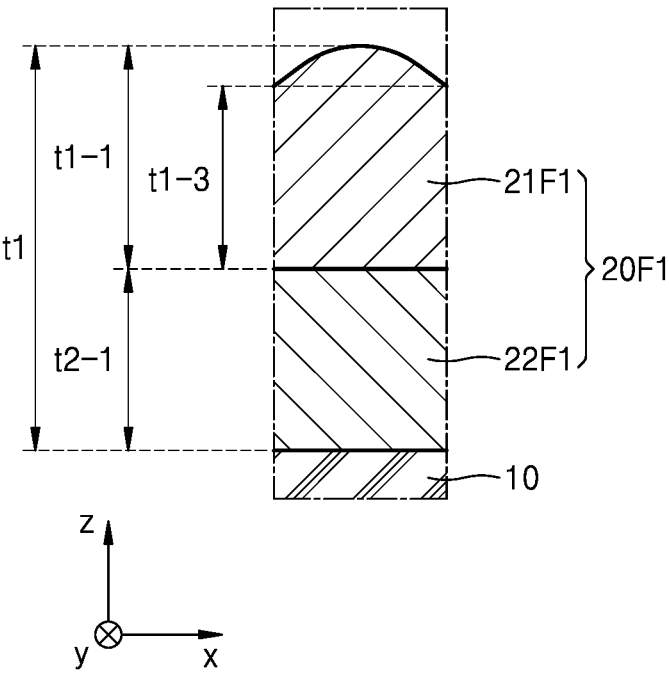
FIGS. 4B, 4C, and 4D are cross-sectional views for describing a thickness of an upper organic layer of FIG. 4A according to embodiments.
Figure 4C:
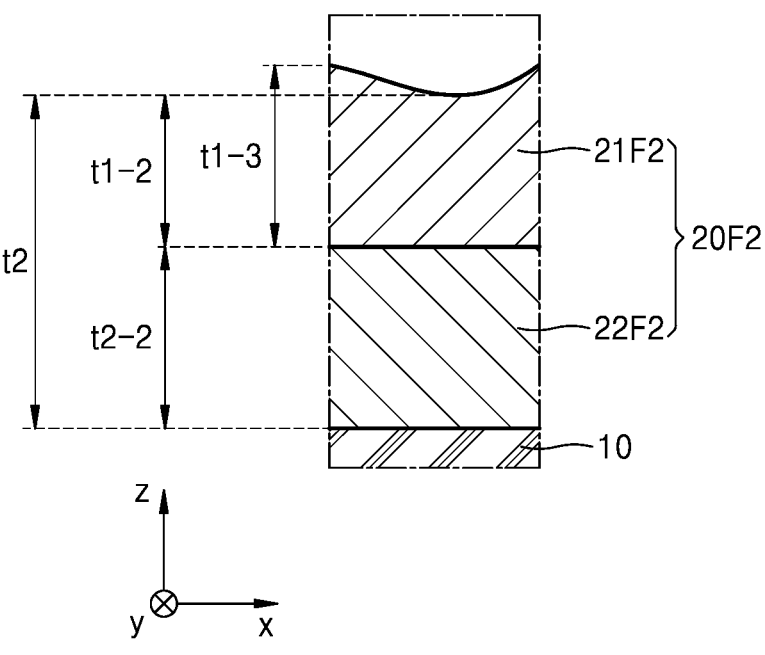
Figure 4D:
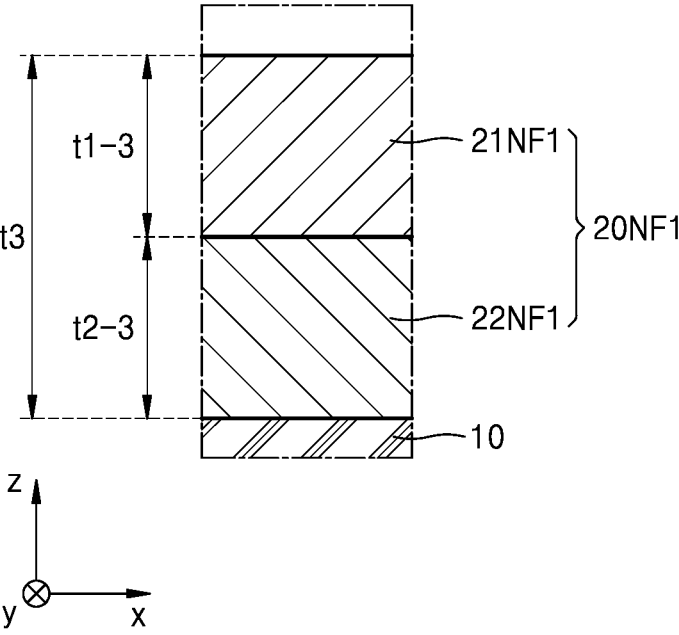

FIG. 3 is a cross-sectional view taken along line I-I' of the display apparatus 1 of FIG. 1. FIG. 4A is an enlarged cross-sectional view schematically illustrating a portion A of the display apparatus 1 of FIG. 3. FIGS. 4B, 4C, and 4D are cross-sectional views for describing a thickness of an upper organic layer 20 of FIG. 4A. In FIGS. 4B and 4D, respectively, a 1-3$^{th}$ thickness t1-3 is also illustrated for convenience of explanation.

As shown in FIGS. 3 and 4A, the display apparatus 1 may include a display panel 10 and the upper organic layer 20. The display panel 10 may display an image. To this end, the display panel 10 may include a plurality of display elements, and the plurality of display elements may emit light. Accordingly, the display panel 10 may display an image through light emitted by the plurality of display elements. In an embodiment, the display element may be an organic light-emitting diode including an organic emission layer. Alternatively, the display element may be a light-emitting diode (LED). The light-emitting diode (LED) may have a microscale or nano-scale size. For example, the light-emitting diode may be a micro light-emitting diode. Alternatively, the light-emitting diode may be a nanorod light-emitting diode. For example, the nanorod light-emitting diode may include gallium nitride (GaN). In an embodiment, a color conversion layer may be disposed on the nanorod light-emitting diode. The color conversion layer may include quantum dots. Alternatively, the display element may be a quantum dot light-emitting diode including a quantum dot emission layer. Alternatively, the display element may be an inorganic light-emitting diode including an inorganic semiconductor. Elements included in the display panel 10 will be described below in detail.

As described above, in an embodiment the display apparatus 1 may include the first non-folding area NFA1, the second non-folding area NFA2, and the foldable area FA. Since the display apparatus 1 includes the display panel 10, the display panel 10 may include the first non-folding area NFA1, the second non-folding area NFA2, and the foldable area FA as described above. For convenience of explanation, the following will be described assuming that the display panel 10 includes the first non-folding area NFA1, the second non-folding area NFA2, and the foldable area FA.

As shown in FIG. 4A, the foldable area FA may include a first foldable area FA1 and a second foldable area FA2. The first foldable area FA1 may be disposed between the first non-folding area NFA1 and the second non-folding area NFA2 (e.g., in the x direction). In an embodiment, a plurality of second foldable areas FA2 may be provided, and the plurality of second foldable areas FA2 may be disposed on both sides of the first foldable area FA1 (e.g., in the x or −x directions). For example, one second foldable area FA2 may be disposed on a first side of the first foldable area FA1 (e.g., in the −x direction) and another second foldable area FA2 may be disposed on the opposite second side of the first foldable area FA1 (e.g., in the x direction). For example, one second foldable area FA2 may be disposed between the first foldable area FA1 and the first non-folding area NFA1 and another second foldable area FA2 may be disposed between the first foldable area FA1 and the second non-folding area NFA2. For convenience of explanation, the following will be described assuming that one second foldable area FA2 is disposed on a first side of the first foldable area FA1 and another second foldable area FA2 is disposed on the opposite second side of the first foldable area FA1.

The upper organic layer 20 may protect the display panel 10. In an embodiment, the upper organic layer 20 may include an optically transparent area. Accordingly, the display panel 10 may display an image through the optically transparent area of the upper organic layer 20. In an embodiment, the transparent area may be surrounded by a bezel area, and a shape of the transparent area may be defined by the bezel area. A light transmittance of the bezel area may be less than a light transmittance of the transparent area. In an embodiment, the bezel area may include an opaque material that blocks light. In an embodiment, the bezel area may have a certain color. The bezel area may be defined by a bezel layer that is provided separately from a transparent organic layer that defines a light-transmitting area, or may be defined by an ink layer formed by being colored or inserted into the transparent organic layer. However, embodiments of the present disclosure are not necessarily limited thereto.

The upper organic layer 20 may include a first non-folding portion 20NF1, a second non-folding portion 20NF2, and a foldable portion 20F. The foldable portion 20F may include a first foldable portion 20F1 and a second foldable portion 20F2. The first non-folding portion 20NF1 may be disposed in the first non-folding area NFA1, and the second non-folding portion 20NF2 may be disposed in the second non-folding area NFA2. The first foldable portion 20F1 may be disposed in the first foldable area FA1, and the second foldable portion 20F2 may be disposed in the second foldable area FA2.

The description of a positional relationship among the first non-folding area NFA1, the second non-folding area NFA2, the first foldable area FA1, and the second foldable area FA2 of the display panel 10 may be applied to a positional relationship among the first non-folding portion 20NF1, the second non-folding portion 20NF2, the first foldable portion 20F1, and the second foldable portion 20F2 of the upper organic layer 20, and thus, a repeated description may be omitted for economy of description. For example, before the display apparatus 1 is folded, the first non-folding portion 20NF1 and the second non-folding portion 29NF2 may be spaced apart from each other in the first direction (e.g., the x direction or the −x direction). When the display apparatus 1 is folded, the first non-folding portion 20NF1 and the second non-folding portion 20NF2 may face each other. The first foldable portion 20F1 and the second foldable portion 20F2 included in the foldable portion 20F may extend in a direction (e.g., the y or −y direction) intersecting a virtual straight line that connects the first non-folding portion 20NF1 to the second non-folding portion 20NF2. The first foldable portion 20F1 may be disposed between the first non-folding portion 20NF1 and the second non-folding portion 20NF2, and a plurality of second foldable portions 20F2 may be disposed on both sides of the first foldable portion 20F1.

The upper organic layer 20 may include a first organic layer 21 and a second organic layer 22. The first organic layer 21 may be disposed over the display panel 10. For example, in an embodiment a bottom surface of the second organic layer 22 may disposed on (e.g., disposed directly thereon) an upper surface of the display panel 10 and a bottom surface of the first organic layer 21 may be disposed on (e.g., disposed directly thereon) a second organic layer 22. The first organic layer 21 may have a relatively high strength and a relatively high hardness to protect the display panel 10 from external impact. In this embodiment, the first organic layer 21 may have a high modulus (e.g., modulus of elasticity). For example, in an embodiment the modulus of the first organic layer 21 may be greater than or equal to about 1 GPa and less than about 10 GPa. In an embodiment, the modulus of the first organic layer 21 may range from about 1 GPa to about 2 GPa.

In an embodiment, the first organic layer 21 may include at least one of an acrylic compound, a siloxane-based compound, and a carbonate-based compound. For example, the first organic layer 21 may include at least one of polyacrylate, polydimethylsiloxane, and polycarbonate.

In an embodiment, the first organic layer 21 may include a $1-1^{st}$ non-folding portion 21NF1, a $1-2^{nd}$ non-folding portion 21NF2, and a first organic foldable portion 21F, and the first organic foldable portion 21F may include a $1-1^{st}$ foldable portion 21F1 and a $1-2^{nd}$ foldable portion 21F2. The $1-1^{st}$ non-folding portion 21NF1 may be disposed in the first non-folding area NFA1, and the $1-2^{nd}$ non-folding portion 21NF2 may be disposed in the second non-folding area NFA2. The $1-1^{st}$ foldable portion 21F1 may be disposed in the first foldable area FA1, and the $1-2^{nd}$ foldable portion 21F2 may be disposed in the second foldable area FA2.

The second organic layer 22 may be interposed between the display panel 10 and the first organic layer 21 (e.g., in the z direction). For example, the first organic layer 21 may be disposed on the second organic layer 22. The second organic layer 22 may prevent or reduce damage to the display panel 10 by absorbing external impact applied to the display panel 10. In an embodiment, the second organic layer 22 may have a low modulus. Preferably, the modulus of the second organic layer 22 may be greater than or equal to about 0.1 GPa and less than about 1 GPa. In an embodiment, the modulus of the second organic layer 22 may be greater than or equal to about 0.1 GPa and less than about 0.5 GPa.

In an embodiment, the second organic layer 22 may include a urethane-based compound. For example, the second organic layer 22 may include polyurethane.

The second organic layer 22 may include a $2-1^{st}$ non-folding portion 22NF1, a $2-2^{nd}$ non-folding portion 22NF2, and a second organic foldable portion 22F, and the second organic foldable portion 22F may include a $2-1^{st}$ foldable portion 22F1 and a $2-2^{nd}$ foldable portion 22F2. The $2-1^{st}$ non-folding portion 22NF1 may be disposed in the first non-folding area NFA1, and the $2-2^{nd}$ non-folding portion 22NF2 may be disposed in the second non-folding area NFA2. The $2-1^{st}$ foldable portion 22F1 may be disposed in the first foldable area FA1, and the $2-2^{nd}$ foldable portion 22F2 may be disposed in the second foldable area FA2. For example, the $2-1^{st}$ non-folding portion 22NF1 may be disposed between the first non-folding area NFA1 and the $1-1^{st}$ non-folding portion 21NF1 (e.g., in the z direction), and the $2-2^{nd}$ non-folding portion 22NF2 may be disposed between the second non-folding area NFA2 and the $1-2^{nd}$ non-folding portion 21NF2 (e.g., in the z direction). The $2-1^{st}$ foldable portion 22F1 may be disposed between the first foldable area FA1 and the $1-1^{st}$ foldable portion 21F1 (e.g., in the z direction), and the $2-2^{nd}$ foldable portion 22F2 may be disposed between the second foldable area FA2 and the $1-2^{nd}$ foldable portion 21F2 (e.g., in the z direction).

In an embodiment, the first non-folding portion 20NF1 of the upper organic layer 20 may include the $1-1^{st}$ non-folding portion 21NF1 and the $2-1^{st}$ non-folding portion 22NF1, and the second non-folding portion 20NF2 of the upper organic layer 20 may include the 1-2nd non-folding portion 21NF2 and the $2-2^{nd}$ non-folding portion 22NF2. The foldable portion 20F of the upper organic layer 20 may include the first organic foldable portion 21F and the second organic foldable portion 22F.

The foldable portion 20F of the upper organic layer 20 may include the first foldable portion 20F1 and the second foldable portion 20F2. For example, the first foldable portion 20F1 of the upper organic layer 20 may include the $1-1^{st}$ foldable portion 21F1 and the $2-1^{st}$ foldable portion 22F1, and the second foldable portion 20F2 of the upper organic layer 20 may include the $1-2^{nd}$ foldable portion 21F2 and the $2-2^{nd}$ foldable portion 22F2.

As shown in FIG. 4A, the upper organic layer 20 may have a thickness that varies according to a position. The expression "thickness" of a portion used herein refers to a distance from a top surface of the portion of the upper organic layer 20 to a bottom surface of the portion of the upper organic layer 20 in a direction (e.g., the z axis direction) perpendicular to the display panel 10. As described above, the upper organic layer 20 may include the first non-folding portion 20NF1, the second non-folding portion 20NF2, and the foldable portion 20F, and the foldable portion 20F may include the first foldable portion 20F1 and the second foldable portion 20F2. A thickness of the first foldable portion 20F1 may be greater than a thickness of the first non-folding portion 20NF1, and a thickness of the second foldable portion 20F2 may be less than a thickness of the first non-folding portion 20NF1. However, embodiments of the present disclosure are not necessarily limited thereto and in some embodiments a thickness of the second foldable portion 20F2 may be the same as a thickness of the first non-folding portion 20NF1 and the second non-folding portion 20NF2 at an interface between the second foldable portion 20F2 and the first non-folding portion 20NF1 and an interface between the second foldable portion 20F2 and the second non-folding portion 20NF2. In an embodiment, a thickness of the second non-folding portion 20NF2 may be the same as or similar to a thickness of the first non-folding portion 20NF1.

The first non-folding portion 20NF1 may have a uniform thickness and the second non-folding portion 29NF2 may have a uniform thickness. Accordingly, the first non-folding portion 20NF1 and the second non-folding portion 29NF2 may have flat top surfaces.

The first foldable portion 20F1 may have a thickness that varies according to a position in the first foldable portion 20F1. In an embodiment, a thickness of the first foldable portion 20F1 may increase away from an outer part of the first foldable portion 20F1 towards a central part of the first foldable portion 20F1. For example, since the second foldable portions 20F2 are disposed on both sides of the first foldable portion 20F1, a thickness of the first foldable portion 20F1 may increase away from the second foldable portion 20F2. For example, as shown in FIGS. 4A and 4B, a thickest portion of the first foldable portion 20F1 may have a first thickness t1. In an embodiment in which the first non-folding portion 20NF1 has a third thickness t3, a difference between the first thickness t1 and the third thickness t3 may be about 100 µm or less. For example, the first foldable portion 20F1 may be thicker than the first non-folding portion 20NF1 by about 100 µm or less. Even in this embodiment, a thickness of the first foldable portion 20F1 may be greater than a thickness of the first non-folding portion 20NF1. For example, in an embodiment, a thickness of a thinnest portion of the first foldable portion 20F1 may be greater than a thickness of the first non-folding portion 20NF1.

Accordingly, as shown in FIG. 4A, the first foldable portion 20F1 before the display apparatus 1 is folded may protrude in a direction (e.g., in a +z direction) away from the display panel 10. For example, the first foldable portion 20F1 may have a convexly curved shape.

The second foldable portion 20F2 may have a thickness that varies according to a position in the second foldable portion 20F2. In detail, a thickness of the second foldable portion 20F2 may decrease away from an outer portion of the second foldable portion 20F2 towards a central part of the second foldable portion 20F2. For example, since the second foldable portion 20F2 is disposed between the first foldable portion 20F1 and the first non-folding portion 20NF1 or between the first foldable portion 20F1 and the second non-folding portion 29NF2, a thickness of the second foldable portion 20F2 may decrease away from the first foldable portion 20F1, the first non-folding portion 20NF1, or the second non-folding portion 20NF2. For example, a thickness of a portion of the second foldable portion 20F2 adjacent to the first foldable portion 20F1 may decrease away from the first foldable portion 20F1, a thickness of a portion of the second foldable portion 20F2 adjacent to the first non-folding portion 20NF1 may decrease away from the first non-folding portion 20NF1, and a thickness of another portion of the second foldable portion 20F2 adjacent to the second non-folding portion 20NF2 may decrease away from the second non-folding portion 20NF2.

For example, a thinnest portion of the second foldable portion 20F2 may have a second thickness t2. In an embodiment in which the first non-folding portion 20NF1 has a third thickness t3, a difference between the second thickness t2 and the third thickness t3 may be about 100 µm or less. For example, the second foldable portion 20F2 may be thinner than the first non-folding portion 20NF1 by about 100 µm or less. Even in this embodiment, a thickness of the second foldable portion 20F2 may be less than a thickness of the first non-folding portion 20NF1. For example, in an embodiment a thickness of a thickest portion of the second foldable portion 20F2 may be less than a thickness of the first non-folding portion 20NF1.

Accordingly, as shown in FIG. 4A, the second foldable portion 20F2 before the display apparatus 1 is folded may be recessed in a direction (e.g., a −z direction) towards the display panel 10. For example, the second foldable portion 20F2 may have a concavely curved shape. Since the second foldable portions 20F2 are disposed on both sides of the first foldable portion 20F1, a top surface of the foldable portion 20F of the upper organic layer 20 (in the +z direction) before the display apparatus 1 is folded may have a substantially W shape.

As described above, the second foldable portion 20F2 may be disposed between the first foldable portion 20F1 and the first non-folding portion 20NF1. A thickness of the first foldable portion 20F1 may be greater than a thickness of the first non-folding portion 20NF1, and a thickness of the second foldable portion 20F2 may be less than a thickness of the first non-folding portion 20NF1. However, since the first foldable portion 20F1 and the second foldable portion 20F2 are connected to each other without being disconnected, there may be a point at an interface between the first foldable portion 20F1 and the second foldable portion 20F2 in which the second foldable portion 20F2 has the same thickness as that of the first non-folding portion 20NF1.

As shown in FIG. 4B, a thickness of the first foldable portion 20F1 may be equal to a sum of a thickness of the 1-1$^{st}$ foldable portion 21F1 and a thickness of the 2-1$^{st}$ foldable portion 22F1. As shown in FIG. 4C, a thickness of the second foldable portion 20F2 may be equal to a sum of a thickness of the 1-2$^{nd}$ foldable portion 21F2 and a thickness of the 2-2$^{nd}$ foldable portion 22F2. As shown in FIG. 4D, a thickness of the first non-folding portion 20NF1 may be equal to a sum of a thickness of the 1-1$^{st}$ non-folding portion 21NF1 and a thickness of the 2-1$^{st}$ non-folding portion 22NF1, and a thickness of the second non-folding portion 29NF2 may be equal to a sum of a thickness of the 1-2$^{nd}$ non-folding portion 21NF2 and a thickness of the 2-2$^{nd}$ non-folding portion 22NF2. Accordingly, a sum of a thickness of the 1-1$^{st}$ foldable portion 21F1 and a thickness of the 2-1$^{st}$ foldable portion 22F1 may be greater than a sum of a thickness of the 1-1$^{st}$ non-folding portion 21NF1 and a thickness of the 2-1$^{st}$ non-folding portion 22NF1. A sum of a thickness of the 1-2$^{nd}$ foldable portion 21F2 and a thickness of the 2-2 fld foldable portion 22F2 may be less than a sum of a thickness of the 1-1$^{st}$ non-folding portion 21NF1 and a thickness of the 2-1$^{st}$ non-folding portion 22NF1.

In an embodiment, the second organic layer 22 may have a uniform thickness, and the second organic layer 22 may be flat. For example, as shown in FIGS. 4A to 4D, the second organic foldable portion 22F disposed under the first organic foldable portion 21F may have a uniform thickness, and the second organic foldable portion 22F may be flat. For example, a thickness of the 2-1$^{st}$ foldable portion 22F1 and a thickness of the 2-2$^{nd}$ foldable portion 22F2 may be the same or similar to each other. As shown in FIGS. 4B to 4D, the $2\text{-}1^{st}$ foldable portion 22F1 may have a $2\text{-}1^{st}$ thickness t2-1, the $2\text{-}2^{nd}$ foldable portion 22F2 may have a $2\text{-}2^{nd}$ thickness t2-2, and the $2\text{-}1^{st}$ non-folding portion 22NF1 may have a $2\text{-}3^{th}$ thickness t2-3. A thickness of the $2\text{-}2^{nd}$ non-folding portion 22NF2 may be the same as or similar to a thickness of the $2\text{-}1^{st}$ non-folding portion 22NF1. For example, the $2\text{-}1^{st}$ thickness t2-1, the $2\text{-}2^{nd}$ thickness t2-2, and the $2\text{-}3^{th}$ thickness t2-3 may be the same or similar to each other.

In an embodiment, the first organic layer 21 may have a thickness that varies according to a position. As described above, the first organic layer 21 may include the $1\text{-}1^{st}$ non-folding portion 21NF1, the $1\text{-}2^{nd}$ non-folding portion 21NF2, and the first organic foldable portion 21F. The first organic foldable portion 21F may include the $1\text{-}1^{st}$ foldable portion 21F1 and the $1\text{-}2^{nd}$ foldable portion 21F2. As shown in FIGS. 4A to 4D, a thickness of the $1\text{-}1^{st}$ foldable portion 21F1 may be greater than a thickness of the $1\text{-}1^{st}$ non-folding portion 21NF1, and a thickness of the $1\text{-}2^{nd}$ foldable portion 21F2 may be less than a thickness of the $1\text{-}1^{st}$ non-folding portion 21NF1. A thickness of the $1\text{-}2^{nd}$ non-folding portion 21NF2 may be the same as or similar to a thickness of the $1\text{-}1^{st}$ non-folding portion 21NF1.

The $1\text{-}1^{st}$ non-folding portion 21NF1 may have a uniform thickness in the $1\text{-}1^{st}$ non-folding portion 21NF1, and the $1\text{-}2^{nd}$ non-folding portion 21NF2 may have a uniform thickness in the $1\text{-}2^{nd}$ non-folding portion 21NF2. Accordingly, the $1\text{-}1^{st}$ non-folding portion 21NF1 and the $1\text{-}2^{nd}$ non-folding portion 21NF2 may have flat top surfaces.

The $1\text{-}1^{st}$ foldable portion 21F1 may have a thickness that varies according to a position in the $1\text{-}1^{st}$ foldable portion 21F1. In an embodiment, a thickness of the $1\text{-}1^{st}$ foldable portion 21F1 may increase away from an outer part of the $1\text{-}1^{st}$ foldable portion 21F1 towards a central part of the $1\text{-}1^{st}$ foldable portion 21F1. For example, since the $1\text{-}2^{nd}$ foldable portions 21F2 are disposed on both sides of the $1\text{-}1^{st}$ foldable portion 21F1 a thickness of the $1\text{-}1^{st}$ foldable portion 21F1 may increase away from the $1\text{-}2^{nd}$ foldable portion 21F2. For example, a thickest portion of the $1\text{-}1^{st}$ foldable portion 21F1 may have a $1\text{-}1^{st}$ thickness t1-1. In an embodiment in which the $1\text{-}1^{st}$ non-folding portion 21NF1 has the $1\text{-}3^{th}$ thickness t1-3, a difference between the $1\text{-}1^{st}$ thickness t1-1 and the $1\text{-}3^{th}$ thickness t1-3 may be about 100 μm or less. For example, the $1\text{-}1^{st}$ foldable portion 21F1 may be thicker than the $1\text{-}1^{st}$ non-folding portion 21NF1 by about 100 μm or less. Even in this embodiment, a thickness of the $1\text{-}1^{st}$ foldable portion 21F1 may be greater than a thickness of the $1\text{-}1^{st}$ non-folding portion 21NF1. For example, a thickness of a thinnest portion of the $1\text{-}1^{st}$ foldable portion 21F1 may be greater than a thickness of the $1\text{-}1^{st}$ non-folding portion 21NF1.

Accordingly, as shown in FIG. 4A, the $1\text{-}1^{st}$ foldable portion 21F1 before the display apparatus 1 is folded may protrude in a direction (e.g., in the +z direction) away from the display panel 10. For example, the $1\text{-}1^{st}$ foldable portion 21F1 may have a convexly curved shape.

The $1\text{-}2^{nd}$ foldable portion 21F2 may have a thickness that varies according to a position in the $1\text{-}2^{nd}$ foldable portion 21F2. In an embodiment, a thickness of the $1\text{-}2^{nd}$ foldable portion 21F2 may decrease away from an outer part of the $1\text{-}2^{nd}$ foldable portion 21F2 towards a central part of the $1\text{-}2^{nd}$ foldable portion 21F2. For example, since the $1\text{-}2^{nd}$ foldable portion 21F2 is disposed between the $1\text{-}1^{st}$ foldable portion 21F1 and the $1\text{-}1^{st}$ non-folding portion 21NF1 or between the $1\text{-}1^{st}$ foldable portion 21F1 and the $1\text{-}2^{nd}$ non-folding portion 21NF2, a thickness of the $1\text{-}2^{nd}$ foldable portion 21F2 may decrease away from the $1\text{-}1^{st}$ foldable portion 21F1, the $1\text{-}1^{st}$ non-folding portion 21NF1, or the $1\text{-}2^{nd}$ non-folding portion 21NF2. In an embodiment, a thickness of a portion of the $1\text{-}2^{nd}$ foldable portion 21F2 adjacent to the $1\text{-}1^{st}$ foldable portion 21F1 may decrease away from the $1\text{-}1^{st}$ foldable portion 21F1, a thickness of another part of the $1\text{-}2^{nd}$ foldable portion 21F2 adjacent to the $1\text{-}1^{st}$ non-folding portion 21NF1 may decrease away from the $1\text{-}1^{st}$ non-folding portion 21NF1, and a thickness of another part of the $1\text{-}2^{nd}$ foldable portion 21F2 adjacent to the $1\text{-}2^{nd}$ non-folding portion 21NF2 may decrease away from the $1\text{-}2^{nd}$ non-folding portion 21NF2.

For example, a thinnest portion of the $1\text{-}2^{nd}$ foldable portion 21F2 may have a $1\text{-}2^{nd}$ thickness t1-2. In an embodiment in which the $1\text{-}1^{st}$ non-folding portion 21NF1 has the $1\text{-}3^{th}$ thickness t1-3, a difference between the $1\text{-}2^{nd}$ thickness t1-2 and the $1\text{-}3^{th}$ thickness t1-3 may be about 100 μm or less. For example, the $1\text{-}2^{nd}$ foldable portion 21F2 may be thinner than the $1\text{-}1^{st}$ non-folding portion 21NF1 by about 100 μm or less. Even in this embodiment, a thickness of the $1\text{-}2^{nd}$ foldable portion 21F2 may be less than a thickness of the $1\text{-}1^{st}$ non-folding portion 21NF1. For example, a thickness of a thickest portion of the $1\text{-}2^{nd}$ foldable portion 21F2 may be less than a thickness of the $1\text{-}1^{st}$ non-folding portion 21NF1.

Accordingly, as shown in FIG. 4A, the $1\text{-}2^{nd}$ foldable portion 21F2 before the display apparatus 1 is folded may be recessed in a direction (e.g., the −z direction) towards the display panel 10. For example, the $1\text{-}2^{nd}$ foldable portion 21F2 may have a concavely curved shape. Since the $1\text{-}2^{nd}$ foldable portions 21F2 are disposed on both sides of the $1\text{-}1^{st}$ foldable portion 21F1, a top surface of the first organic foldable portion 21F of the first organic layer 21 (in the +z direction) before the display apparatus 1 is folded may have a substantially W shape.

As described above, the $1\text{-}2^{nd}$ foldable portion 21F2 may be disposed between the $1\text{-}1^{st}$ foldable portion 21F1 and the $1\text{-}1^{st}$ non-folding portion 21NF1. A thickness of the $1\text{-}1^{st}$ foldable portion 21F1 may be greater than a thickness of the $1\text{-}1^{st}$ non-folding portion 21NF1, and a thickness of the $1\text{-}2^{nd}$ foldable portion 21F2 may be less than a thickness of the $1\text{-}1^{st}$ non-folding portion 21NF1. However, since the $1\text{-}1^{st}$ foldable portion 21F1 and the $1\text{-}2^{nd}$ foldable portion 21F2 are connected to each other without being disconnected, there may be a point at an interface between the $1\text{-}1^{st}$ foldable portion 21F1 and the $1\text{-}2^{nd}$ foldable portion 21F2 in which the $1\text{-}2^{nd}$ foldable portion 21F2 has the same thickness as that of the $1\text{-}1^{st}$ foldable portion 21F1.

Even in this embodiment, a top surface of the foldable portion 20F of the upper organic layer 20 (in the +z direction) before the display apparatus 1 is folded may have a substantially W shape. For example, a sum of a thickness of the $1\text{-}1^{st}$ foldable portion 21F1 and a thickness of the $2\text{-}1^{st}$ foldable portion 22F1 may be greater than a sum of a thickness of the $1\text{-}1^{st}$ non-folding portion 21NF1 and a thickness of the $2\text{-}1^{st}$ non-folding portion 22NF1, and a sum of a thickness of the $1\text{-}2^{nd}$ foldable portion 21F2 and a thickness of the $2\text{-}2^{nd}$ foldable portion 22F2 may be less than a sum of a thickness of the $1\text{-}1^{st}$ non-folding portion 21NF1 and a thickness of the $2\text{-}1^{st}$ non-folding portion 22NF1. For example, a sum of the $1\text{-}1^{st}$ thickness t1-1 and the $2\text{-}1^{st}$ thickness t2-1 may be greater than a sum of the $1\text{-}3^{th}$ thickness t1-3 and a thickness of the $2\text{-}3^{th}$ thickness t2-3, and a sum of the $1\text{-}2^{nd}$ thickness t1-2 and the $2\text{-}2^{nd}$ thickness t2-2 may be less than a sum of the $1\text{-}3^{th}$ thickness t1-3 and the $2\text{-}3^{th}$ thickness t2-3.

Although the second organic layer 22 has a uniform thickness and the first organic layer 21 has a thickness that varies according to a position in an embodiment shown in FIG. 4A, embodiments of the present disclosure are not necessarily limited thereto. For example, in an embodiment, the second organic layer 22 may have a thickness that varies according to a position, and the first organic layer 21 may have a uniform thickness. In an embodiment, both the second organic layer 22 and the first organic layer 21 may have a thickness that varies according to a position.

Figure 5A:
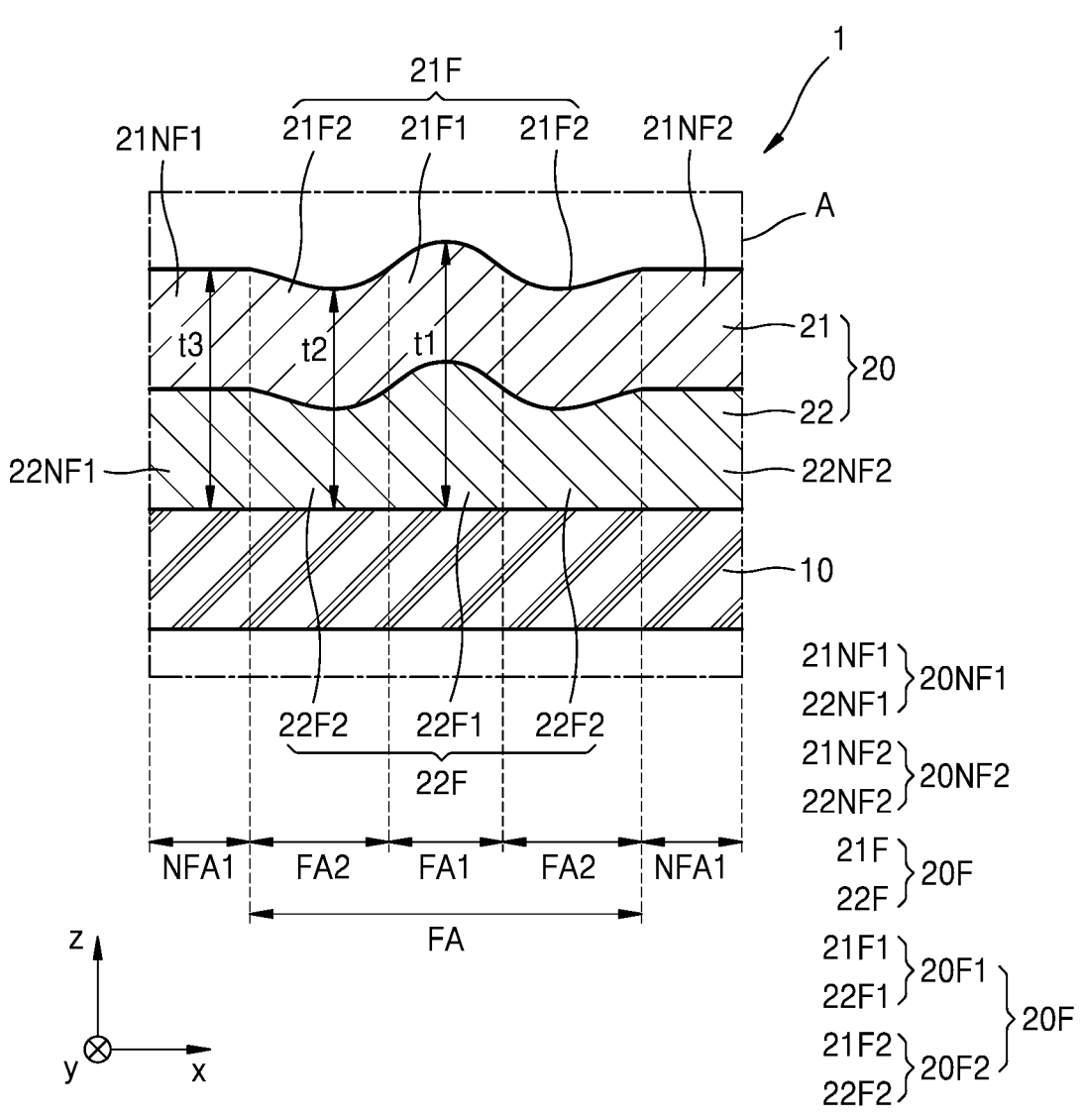
FIG. 5A is a cross-sectional view schematically illustrating a display apparatus, according to an embodiment.
Figure 5B:
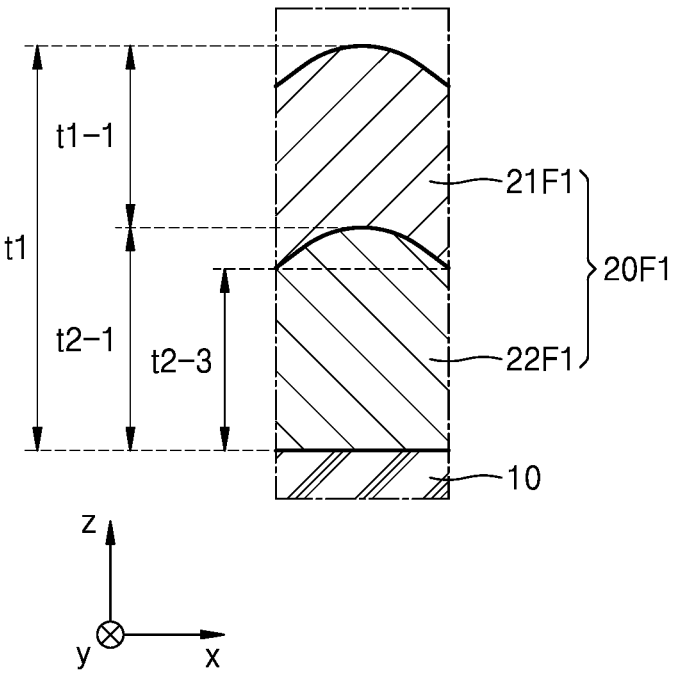
FIGS. 5B, 5C, and 5D are cross-sectional views for describing a thickness of an upper organic layer of FIG. 5A according to embodiments.
Figure 5C:
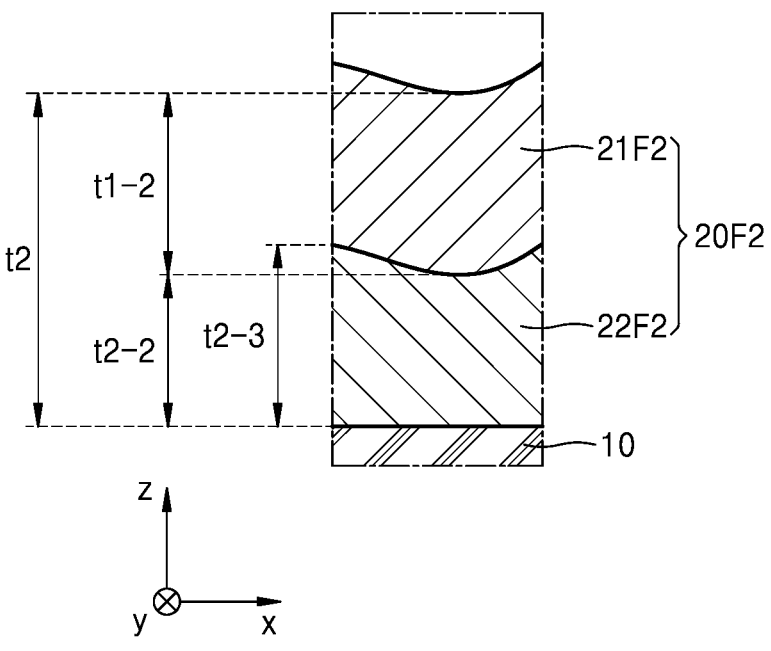
Figure 5D:
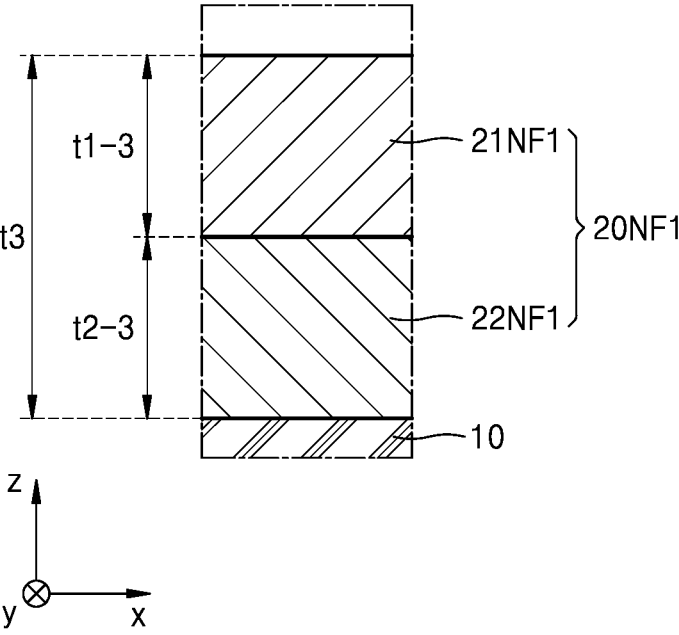

FIG. 5A is a cross-sectional view schematically illustrating the display apparatus 1, according to an embodiment. FIGS. 5B, 5C, and 5D are views for describing a thickness of the upper organic layer 20 of FIG. 5A. In FIGS. 5B and 5C, the 2-3$^{th}$ thickness t2-3 is also illustrated for convenience of explanation. The display apparatus 1 according to an embodiment is similar to the display apparatus 1 described with reference to FIGS. 1 to 4D, and thus, the following will focus on a difference from the display apparatus 1 of FIGS. 1 to 4D. In FIGS. 5A to 5D, the same members as those in FIGS. 1 to 4D are denoted by the same reference numerals, and thus, a repeated description thereof may be omitted for economy of description.

The display apparatus 1 described with reference to FIG. 4A may include the display panel 10 and the upper organic layer 20, and the upper organic layer 20 may include the first organic layer 21 and the second organic layer 22. As shown in FIG. 5A, the display apparatus 1 according to an embodiment may include the display panel 10 and the upper organic layer 20, and the upper organic layer 20 may include the first organic layer 21 and the second organic layer 22.

However, as shown in FIGS. 5A to 5D, the second organic layer 22 may have a thickness that varies according to a position and does not have a flat upper surface. As described above, the second organic layer 22 may include the 2-1$^{st}$ non-folding portion 22NF1, the 2-2$^{nd}$ non-folding portion 22NF2, and the second organic foldable portion 22F, and the second organic foldable portion 22F may include the 2-1$^{st}$ foldable portion 22F1 and the 2-2$^{nd}$ foldable portion 22F2. For example, a thickness of the 2-1$^{st}$ foldable portion 22F1 may be greater than a thickness of the 2-1$^{st}$ non-folding portion 22NF1, and a thickness of the 2-2$^{nd}$ foldable portion 22F2 may be less than a thickness of the 2-1St non-folding portion 22NF1. A thickness of the 2-2$^{nd}$ non-folding portion 22NF2 may be the same as or similar to a thickness of the 2-1$^{st}$ non-folding portion 22NF1.

The 2-1$^{st}$ non-folding portion 22NF1 may have a uniform thickness in the 2-1$^{st}$ non-folding portion 22NF1, and the 2-2$^{nd}$ non-folding portion 22NF2 may have a uniform thickness in the 2-2$^{nd}$ non-folding portion 22NF2. Accordingly, the 2-1$^{st}$ non-folding portion 22NF1 and the 2-2$^{nd}$ non-folding portion 22NF2 may have flat top surfaces.

The 2-1$^{st}$ foldable portion 22F1 may have a thickness that varies according to a position in the 2-1$^{st}$ foldable portion 22F1. For example, a thickness of the 2-1$^{st}$ foldable portion 22F1 may increase away from an outer part of the 2-1$^{st}$ foldable portion 22F1 towards a central part of the 2-1$^{st}$ foldable portion 22F1. In an embodiment, since the 2-2$^{nd}$ foldable portions 22F2 are disposed on both sides of the 2-1$^{st}$ foldable portion 22F1, a thickness of the 2-1$^{st}$ foldable portion 22F1 may increase away from the 2-2$^{nd}$ foldable portion 22F2. For example, a thickest portion of the 2-1$^{st}$ foldable portion 22F1 may have the 2-1$^{st}$ thickness t2-1. In an embodiment in which the 2-1$^{st}$ non-folding portion 22NF1 has the 2-3$^{th}$ thickness t2-3, a difference between the 2-1$^{st}$ thickness t2-1 and the 2-3$^{th}$ thickness t2-3 may be about 100 μm or less. For example, the 2-1$^{st}$ foldable portion 22F1 may be thicker than the 2-1$^{st}$ non-folding portion 22NF1 by about 100 μm or less. Even in this embodiment, a thickness of the 2-1$^{st}$ foldable portion 22F1 may be greater than a thickness of the 2-1$^{st}$ non-folding portion 22NF1. For example, a thickness of a thinnest portion of the 2-1$^{st}$ foldable portion 22F1 may be greater than a thickness of the 2-1$^{st}$ non-folding portion 22NF1.

Accordingly, as shown in FIG. 5A, the 2-1$^{st}$ foldable portion 22F1 before the display apparatus 1 is folded may protrude in a direction (e.g., the +z direction) away from the display panel 10. For example, the 2-1$^{st}$ foldable portion 22F1 may have a convexly curved shape.

The 2-2$^{nd}$ foldable portion 22F2 may have a thickness that varies according to a position in the 2-2$^{nd}$ foldable portion 22F2. In detail, a thickness of the 2-2$^{nd}$ foldable portion 22F2 may decrease away from an outer part of the 2-2$^{nd}$ foldable portion 22F2 towards a central part of the 2-2$^{nd}$ foldable portion 22F2. For example, since the 2-2$^{nd}$ foldable portion 22F2 is disposed between the 2-1$^{st}$ foldable portion 22F1 and the 2-1$^{st}$ non-folding portion 22NF1 or between the 2-1$^{st}$ foldable portion 22F1 and the 2-2$^{nd}$ non-folding portion 22NF2, a thickness of the 2-2$^{nd}$ foldable portion 22F2 may decrease away from the 2-1$^{nd}$ foldable portion 22F1, the 2-1$^{st}$ non-folding portion 22NF1, or the 2-2$^{nd}$ non-folding portion 22NF2. In an embodiment, a thickness of a part of the 2-2$^{nd}$ foldable portion 22F2 adjacent to the 2-1$^{st}$ foldable portion 22F1 may decrease away from the 2-1$^{st}$ foldable portion 22F1, a thickness of another part of the 2-2$^{nd}$ foldable portion 22F2 adjacent to the 2-1$^{st}$ non-folding portion 22NF1 may decrease away from the 2-1$^{st}$ non-folding portion 22NF1, and a thickness of another part of the 2-2$^{nd}$ foldable portion 22F2 adjacent to the 2-2$^{nd}$ non-folding portion 22NF2 may decrease away from the 2-2$^{nd}$ non-folding portion 22NF2.

For example, a thinnest portion of the 2-2$^{nd}$ foldable portion 22F2 may have the 2-2$^{nd}$ thickness t2-2. In an embodiment in which the 2-1$^{st}$ non-folding portion 22NF1 has the 2-3$^{th}$ thickness t2-3, a difference between the 2-2$^{nd}$ thickness t2-2 and the 2-3$^{th}$ thickness t2-3 may be about 100 μm or less. For example, the 2-2$^{nd}$ foldable portion 22F2 may be thinner than the 2-1$^{st}$ non-folding portion 22NF1 by about 100 μm or less. Even in this embodiment, a thickness of the 2-2$^{nd}$ foldable portion 22F2 may be less than a thickness of the 2-1$^{st}$ non-folding portion 22NF1. For example, a thickness of a thickest portion of the 2-2$^{nd}$ foldable portion 22F2 may be less than a thickness of the 2-1$^{st}$ non-folding portion 22NF1.

Accordingly, as shown in FIG. 5A, the 2-2$^{nd}$ foldable portion 22F2 before the display apparatus 1 is folded may be recessed in a direction (e.g., the −z direction) towards the display panel 10. For example, the 2-2$^{nd}$ foldable portion 22F2 may have a concavely curved shape. Since the 2-2$^{nd}$ foldable portions 22F2 are disposed on both sides of the 2-1$^{st}$ foldable portion 22F1, a top surface of the second organic foldable portion 22F of the second organic layer 22 (in the +z direction) before the display apparatus 1 is folded may have a substantially W shape.

As described above, the 2-2$^{nd}$ foldable portion 22F2 may be disposed between the 2-1$^{st}$ foldable portion 22F1 and the 2-1$^{st}$ non-folding portion 22NF1. A thickness of the 2-1$^{st}$ foldable portion 22F1 may be greater than a thickness of the 2-1$^{st}$ non-folding portion 22NF1, and a thickness of the 2-2$^{nd}$ foldable portion 22F2 may be less than a thickness of the 2-1$^{st}$ non-folding portion 22NF1. Since the 2-1$^{st}$ foldable portion 22F1 and the 2-2$^{nd}$ foldable portion 22F2 are connected to each other without being disconnected, there may be a point having the same thickness as that of the 2-1$^{st}$ non-folding portion 22NF1 between the 2-1$^{st}$ foldable portion 22F1 and the 2-2$^{nd}$ foldable portion 22F2.

In this embodiment, the first organic layer 21 may have a uniform thickness. For example, the first organic foldable portion 21F disposed over the second organic foldable portion 22F may have a uniform thickness. For example, a thickness of the 1-1$^{st}$ foldable portion 21F1 and a thickness of the 1-2$^{nd}$ foldable portion 21F2 may be the same or similar to each other. For example, the 1-1$^{st}$ thickness t1-1, the 1-2$^{nd}$ thickness t1-2, and the 1-3$^{th}$ thickness may be the same or similar to each other. Since a top surface of the second organic foldable portion 22F of the second organic layer 22 (in the +z direction) has a substantially W shape, a top surface of the first organic foldable portion 21F of the first organic layer 21 (in the +z direction) may also have a substantially W shape.

Accordingly, even in this embodiment, a top surface of the foldable portion 20F of the upper organic layer 20 (in the +z direction) before the display apparatus 1 is folded may have a substantially W shape. For example, a sum of a thickness of the 1-1$^{st}$ foldable portion 21F1 and a thickness of the 2-1$^{st}$ foldable portion 22F1 may be greater than a sum of a thickness of the 1-1$^{st}$ non-folding portion 21NF1 and a thickness of the 2-1$^{st}$ non-folding portion 22NF1, and a sum of a thickness of the 1-2$^{nd}$ foldable portion 21F2 and a thickness of the 2-2$^{nd}$ foldable portion 22F2 may be less than a sum of a thickness of the 1-1$^{st}$ non-folding portion 21NF1 and a thickness of the 2-1$^{st}$ non-folding portion 22NF1. For example, a sum of the 1-1$^{st}$ thickness t1-1 and the 2-1$^{st}$ thickness t2-1 may be greater than a sum of the 1-3$^{th}$ thickness t1-3 and the 2-3$^{th}$ thickness t2-3, and a sum of the 1-2$^{nd}$ thickness t1-2 and the 2-2$^{nd}$ thickness t2-2 may be less than a sum of the 1-3$^{th}$ thickness t1-3 and the 2-3$^{th}$ thickness t2-3.

Figure 6:
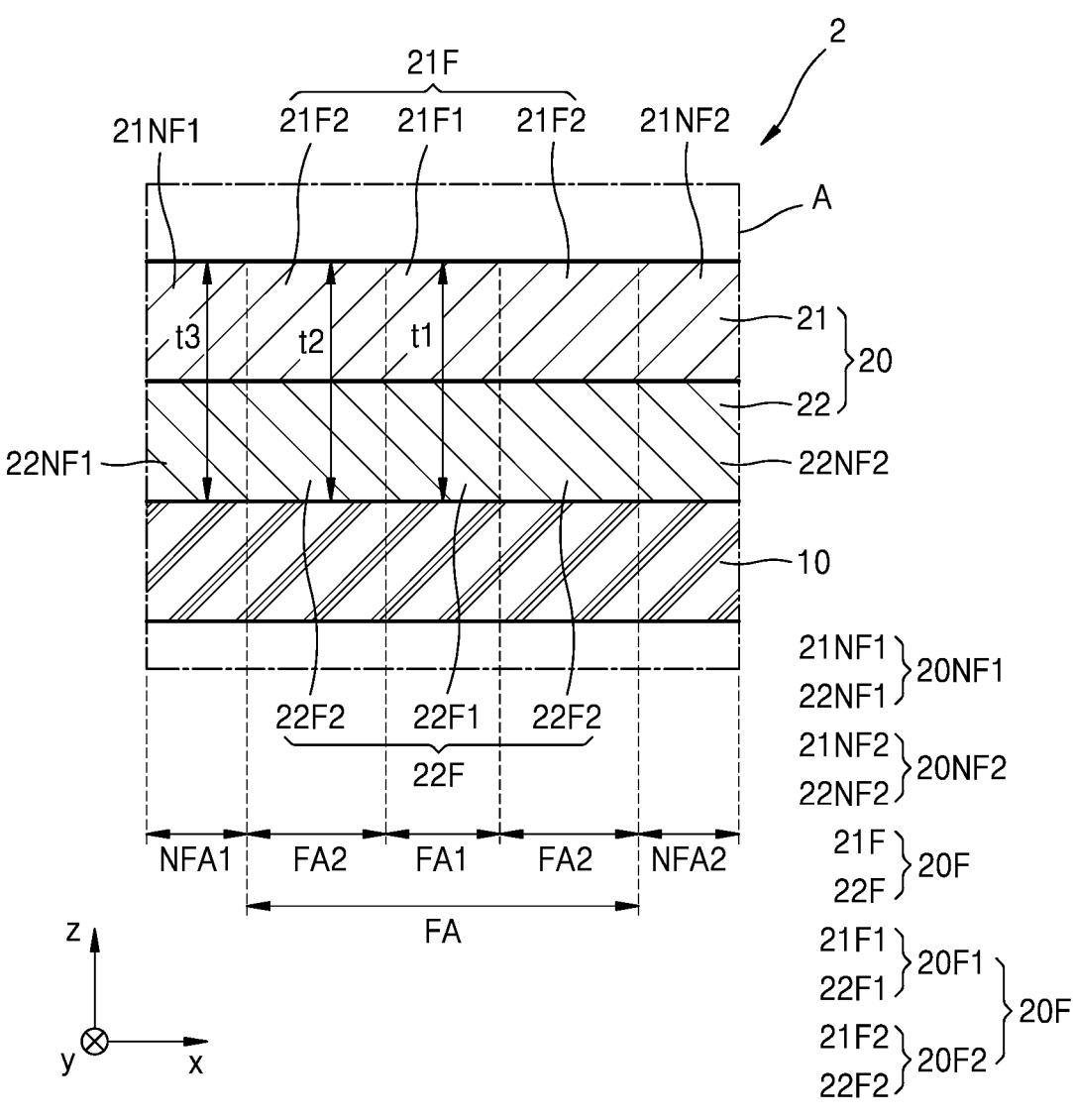
FIG. 6 is a cross-sectional view schematically illustrating a part of a display apparatus, according to a comparative example.
Figure 7:
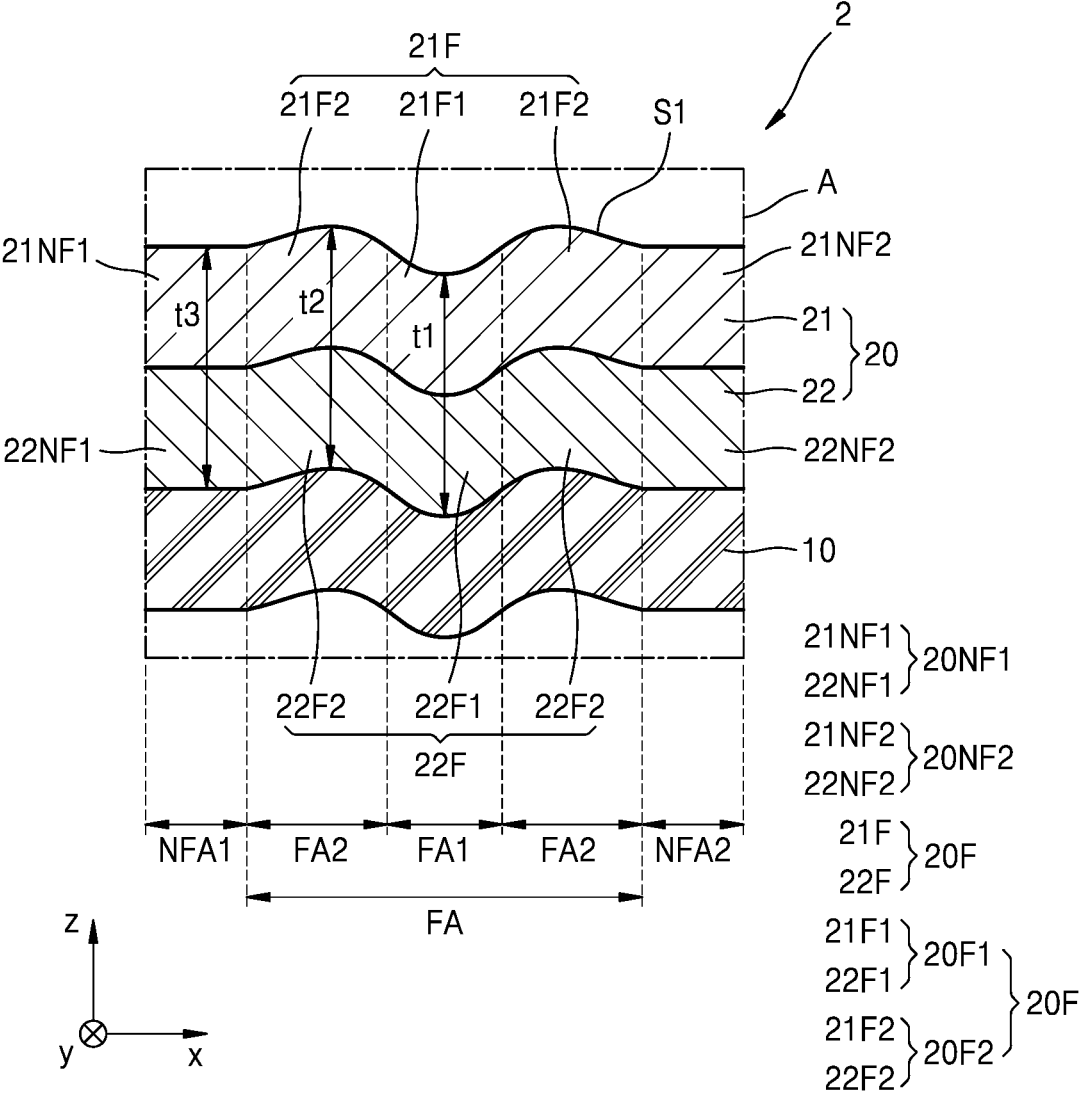
FIG. 7 is a cross-sectional view for describing deformation of a foldable area of a display apparatus, according to a comparative example.

FIG. 6 is a cross-sectional view schematically illustrating a portion of a display apparatus 2, according to a comparative example. FIG. 7 is a view for describing deformation of the foldable area FA of the display apparatus 2, according to a comparative example. In detail, FIG. 6 illustrates a state of the display apparatus 2 before being folded, according to a comparative example. FIG. 7 illustrates a state in which the display apparatus 2 is unfolded, according to a comparative example. The display apparatus 2 according to a comparative example is similar to the display apparatus 1 according to an embodiment, and thus, the following will focus on a difference from the display apparatus 1 according to an embodiment.

As shown in FIG. 6, the display apparatus 2 according to a comparative example may include the display panel 10 and the upper organic layer 20, and the upper organic layer 20 may include the first organic layer 21 and the second organic layer 22. In comparison to the display apparatus 1 according to an embodiment, the upper organic layer 20 of the display apparatus 2 according to a comparative example may have a uniform thickness. Therefore, the top surface of the upper organic layer 20 may be flat. For example, the first organic layer 21 may have a uniform thickness, and the second organic layer 22 may also have a uniform thickness. A thickness of the 1-1 St foldable portion 21F1 a thickness of the 1-2$^{nd}$ foldable portion 21F2, a thickness of the 1-1$^{st}$ non-folding portion 21NF1, and a thickness of the -2$^{nd}$ non-folding portion 21NF2 may be the same or similar to each other. A thickness of the 2-1$^{st}$ foldable portion 22F1, a thickness of the 2-2$^{nd}$ foldable portion 22F2, a thickness of the 2-1$^{st}$ non-folding portion 22NF1, and a thickness of the 2-2$^{nd}$ non-folding portion 22NF2 may be the same or similar to each other. Thus, the first thickness t1, the second thickness t2, and the third thickness t3 may be the same or similar to each other.

When the display apparatus is folded, the foldable area FA of the display apparatus may be deformed. For example, when the display apparatus is folded, the foldable area FA of the display apparatus may be bent, and thus, compressive stress or tensile stress may be applied to the foldable area FA. The foldable area FA may be deformed by the compressive stress or the tensile stress. Consequently, even when the display apparatus is unfolded again, the deformed foldable area FA may not be restored to its original shape.

As shown in FIG. 7 schematically illustrating the display apparatus 2 that is unfolded, when the upper organic layer 20 has a uniform thickness and a flat surface according a comparative embodiment, the first foldable portion 20F1 of the upper organic layer 20 may be recessed in a direction (e.g., the −z direction) towards the display panel 10, and the second foldable portion 20F2 of the upper organic layer 20 may protrude in a direction (e.g., the +z direction) away from the display panel 10. For example, when the display apparatus 2 is folded and then unfolded, a top surface of the foldable portion 20F of the upper organic layer 20 (in the +z direction) may have a substantially M shape when it is in the unfolded state. Thus, when the display apparatus 2 is folded and then unfolded, the first surface S1 of the foldable area FA of the display apparatus 2 may not be flat. Accordingly, a display surface of the display apparatus 2 may not be flat after being folded and then unfolded.

However, in the display apparatus 1 according to an embodiment of the present disclosure, the upper organic layer 20 may have a thickness that varies according to a position. For example, a thickness of the first foldable portion 20F1 may be greater than a thickness of the first non-folding portion 20NF1, and a thickness of the second foldable portion 20F2 may be less than a thickness of the first non-folding portion 20NF.

Accordingly, before the display apparatus 1 is folded, the first foldable portion 20F1 of the upper organic layer 20 may protrude in a direction (e.g., the +z direction) away from the display panel 10, and the second foldable portion 20F2 may be recessed in a direction (e.g., the −z direction) towards the display panel 10. A top surface of the foldable portion 20F of the display apparatus 1 (in the +z direction) before being folded may have an inverted shape of a top surface of the foldable portion 20F of the display apparatus 2 (in the +z direction) that is unfolded according to the comparative embodiment.

Figure 8:
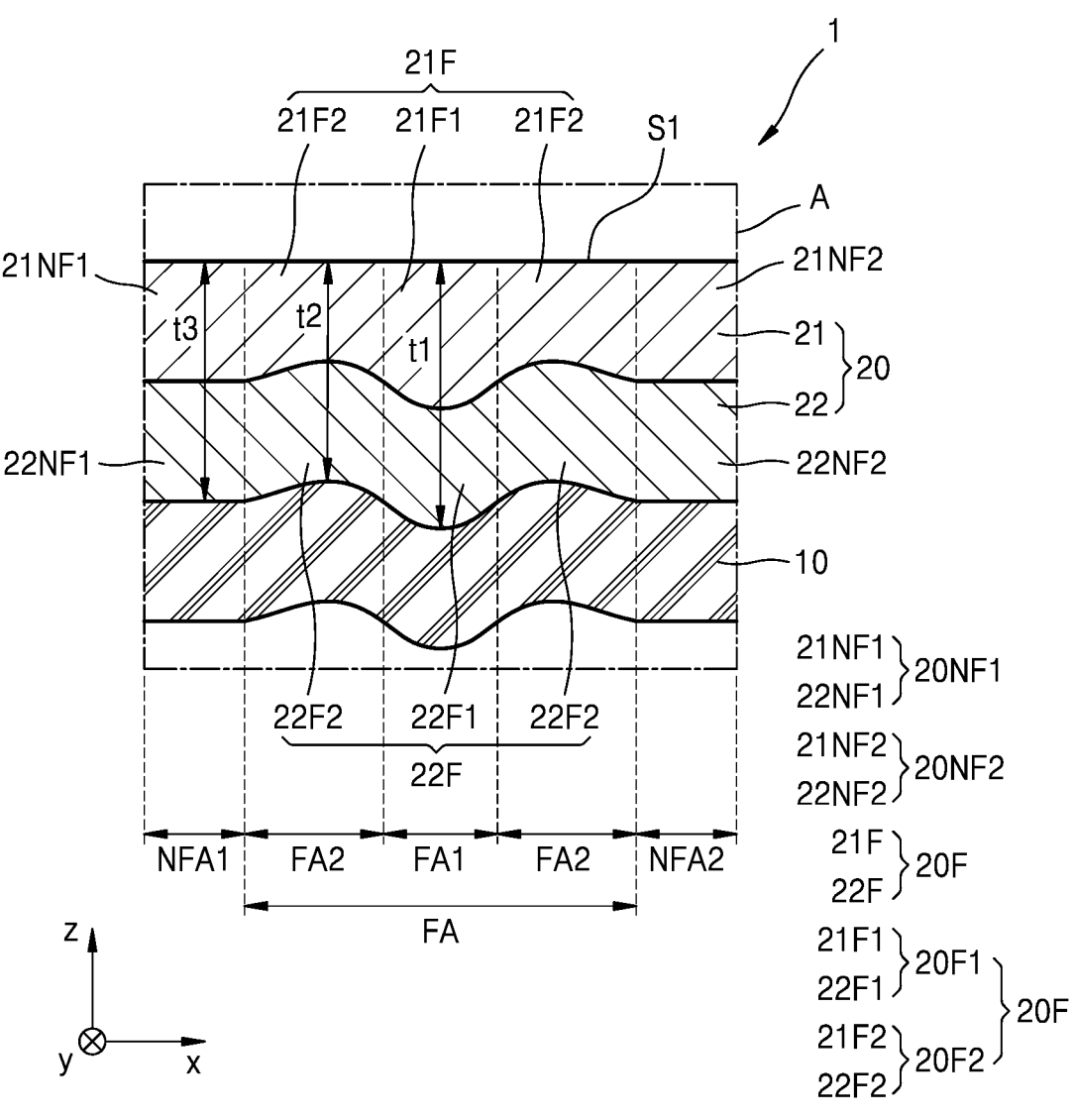
FIG. 8 is a cross-sectional view for describing deformation of a foldable area of the display apparatus, according to an embodiment.

As shown in FIG. 8 which is a view for describing deformation of the foldable area FA of the display apparatus 1 according to an embodiment, the first surface S1 of the foldable area FA of the display apparatus 1 may be flat. A display surface of the display apparatus 1 may be flat. For example, the first foldable portion 20F1 of the display apparatus 1 before being folded may protrude in a direction (e.g., the +z direction) away from the display panel 10. Accordingly, even when the display apparatus 1 is folded and then unfolded, a degree to which the first foldable portion 20F1 is recessed in a direction (e.g., the −z direction) towards the display panel 10 may be reduced. The second foldable portion 20F2 of the display apparatus 1 before being folded may be recessed in a direction (e.g., the −z direction) towards the display panel 10. Accordingly, even when the display apparatus 1 is folded and then unfolded, a degree to which the second foldable portion 20F2 protrudes in a direction (e.g., the +z direction) away from the display panel 10 may be reduced. Accordingly, a display surface of the display apparatus 1 may be flat. For example, a flatness of the display surface of the display apparatus 1 that is unfolded may be increased.

When a difference between the first thickness t1 and the third thickness t3 or a difference between the second thickness t2 and the third thickness t3 exceeds about 100 μm, a degree to which the first foldable portion 20F1 is recessed in a direction (e.g., the −z direction) towards the display panel 10 may be excessively reduced, or a degree to which the second foldable portion 20F2 protrudes in a direction (e.g., the +z direction) away from the display panel 10 may be excessively reduced. Accordingly, the display surface of the display apparatus 1 may not be flat. However, as described above, a difference between the first thickness t1 and the third thickness t3 and a difference between the second thickness t2 and the third thickness t3 of the display apparatus 1 according to an embodiment may each be about 100 μm or less. Accordingly, the display surface of the display apparatus 1 may be flat.

In an embodiment, a protective film may be disposed under the display panel 10 to face a bottom surface of the display panel 10 (e.g., in the −z direction). In an embodiment, the protective film may be disposed under a substrate 100 to face a bottom surface of a substrate 100 (see FIG. 9) (e.g., in the −z direction). The protective film may protect the display panel 10 during a process of manufacturing the display apparatus. An adhesive layer may be interposed between the protective film and the substrate 100, and the protective film may be attached to the bottom of the substrate 100 due to the adhesive layer. In an embodiment, the adhesive layer interposed between the protective film and the substrate 100 may include at least one of an optically clear resin (OCR), an optically clear adhesive (OCA), and a pressure-sensitive adhesive (PSA).

Figure 9:
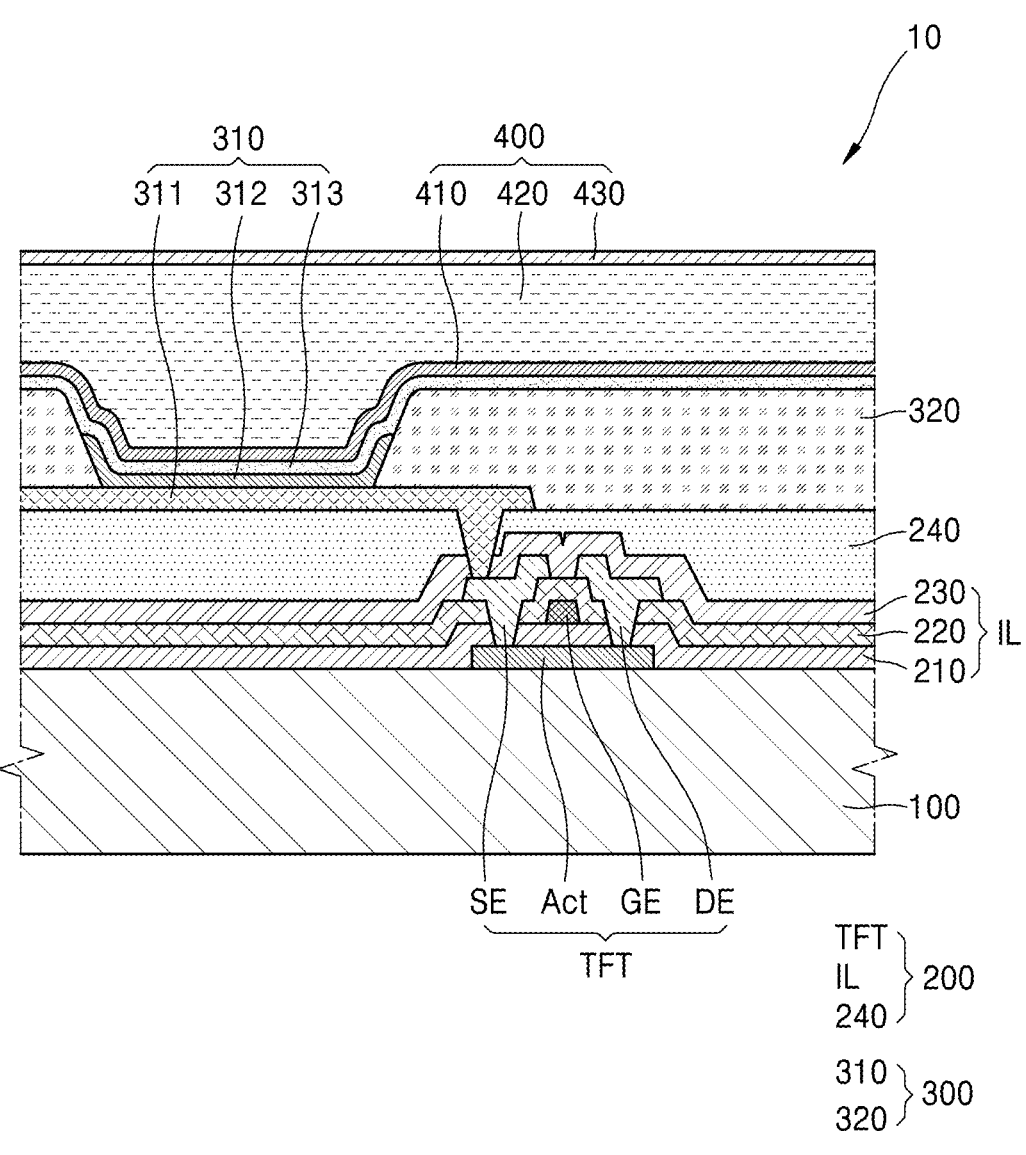
FIG. 9 is a cross-sectional view schematically illustrating a portion of a display panel included in a display apparatus, according to an embodiment.

FIG. 9 is a cross-sectional view schematically illustrating a portion of the display panel 10 included in the display apparatus 1, according to an embodiment. As shown in FIG. 9, the display panel 10 may include the substrate 100, a pixel circuit layer 200, a display element layer 300, and an encapsulation layer 400. The pixel circuit layer 200 may be disposed on the substrate 100. The substrate 100 may include any of various flexible or bendable materials. For example, in an embodiment the substrate 100 may include glass, a metal, or a polymer resin. Also, the substrate 100 may include a polymer resin such as polyethersulfone, polyacrylate, polyetherimide, polyethylene naphthalate, polyethylene terephthalate, polyphenylene sulfide, polyarylate, polyimide, polycarbonate, or cellulose acetate propionate. However, various modifications may be made. For example, the substrate 100 may have a multi-layer structure including two layers each including a polymer resin and a barrier layer including an inorganic material (e.g., silicon oxide, silicon nitride, or silicon oxynitride) and interposed between the two layers.

The pixel circuit layer 200 may include a thin-film transistor TFT, an insulating layer IL, and a planarization layer 240. As shown in FIG. 9, in an embodiment the thin-film transistor TFT may include a semiconductor layer Act including amorphous silicon, polycrystalline silicon, an oxide semiconductor material, or an organic semiconductor material, a gate electrode GE, a source electrode SE, and a drain electrode DE. The insulating layer IL may include a gate insulating layer 210, a first interlayer insulating layer 220, and a second interlayer insulating layer 230. To provide insulation between the semiconductor layer Act and the gate electrode GE, the gate insulating layer 210 including an inorganic material such as silicon oxide, silicon nitride, and/or silicon oxynitride may be interposed between the semiconductor layer Act and the gate electrode GE. In addition, the first interlayer insulating layer 220 including an inorganic material such as silicon oxide, silicon nitride, and/or silicon oxynitride may be disposed on the gate electrode GE, and the second interlayer insulating layer 230 may be disposed to cover the source electrode SE and the drain electrode DE. The insulating layer IL including an inorganic material may be formed through chemical vapor deposition (CVD) or atomic layer deposition (ALD). The planarization layer 240 may be disposed on the thin-film transistor TFT. The planarization layer 240 may generally planarize an upper portion of the thin-film transistor TFT. In an embodiment, the planarization layer 240 may include an organic material such as acryl, benzocyclobutene (BCB), or hexamethyldisiloxane (HMDSO). Although the planarization layer 240 has a single-layer structure in FIG. 9, embodiments of the present disclosure are not necessarily limited thereto. For example, the planarization layer 240 may have a multi-layer structure.

The display element layer 300 may be disposed on the pixel circuit layer 200. The display element layer 300 may include a display element 310 electrically connected to the thin-film transistor TFT and a pixel-defining film 320. The display element 310 may be an organic light-emitting diode including the pixel electrode 311, a counter electrode 313, and an intermediate layer 312 interposed between the pixel electrode 311 and the counter electrode 313 and including an emission layer. When the display element 310 is electrically connected to the thin-film transistor TFT, it may mean that the pixel electrode 311 of the display element 310 is electrically connected to the thin-film transistor TFT.

The pixel electrode 311 is electrically connected to the thin-film transistor TFT by contacting any one of the source electrode SE and the drain electrode DE through an opening portion formed in the planarization layer 240 as shown in FIG. 9. In an embodiment, the pixel electrode 311 includes a light-transmitting conductive layer formed of a light-transmitting conductive oxide such as ITO, $In_2O_3$, or IZO, and a reflective layer formed of a metal such as aluminum (Al) or silver (Ag). For example, the pixel electrode 311 may have a three-layer structure including ITO/Ag/ITO.

The pixel-defining film 320 may be disposed on the planarization layer 240. The pixel-defining film 320 defines a pixel by having an opening corresponding to each pixel. For example, in an embodiment the opening may expose at least a central portion of the pixel electrode 311. Also, as shown in FIG. 9, the pixel-defining film 320 increases a distance between an edge of the pixel electrode 311 and the counter electrode 313 over the pixel electrode 311, to prevent an arc or the like from occurring on the edge of the pixel electrode 311. In an embodiment, the pixel-defining film 320 may include an organic material such as polyimide or hexamethyldisiloxane (HMDSO).

The intermediate layer 312 of the display element 310 may include a low molecular weight material or a high molecular weight material. In an embodiment in which the intermediate layer 312 has a low molecular weight material, the intermediate layer 312 may have a single or multi-layer structure in which a hole injection layer (HIL); a hole transport layer (HTL), an emission layer (EML), an electron transport layer (ETL), and an electron injection layer (EIL) are stacked, and may be formed by using vacuum deposition. In an embodiment in which the intermediate layer 312 includes a high molecular weight material, the intermediate layer 312 may have a structure including an HTL and an EML. In this case; the HTL may include poly(3,4-ethylene-dioxythiophene) (PEDOT), and the EML may include a polymer material such as a polyphenylene vinylene (PPV)-based material or a polyfluorene-based material. In an embodiment, the intermediate layer 312 may be formed by using screen printing, inkjet printing, laser-induced thermal imaging (LITI); or the like. However, embodiments of the present disclosure are not necessarily limited thereto and the intermediate layer 312 may have any of various structures. The intermediate layer 312 may include a layer that is integrally formed over a plurality of pixel electrodes 311, or may include a layer that is patterned to correspond to each of the plurality of pixel electrodes 311.

In an embodiment, the counter electrode 313 may be integrally formed in a plurality of display elements 310 to correspond to a plurality of pixel electrodes 311. The counter electrode 313 may include a light-transmitting conductive layer formed of ITO, $In_2O_3$, or IZO, and may include a semi-transmissive film including a metal such as Al or Ag. For example; the counter electrode 313 may be a semi-transmissive film including magnesium (Mg) or Ag. However, embodiments of the present disclosure are not necessarily limited thereto.

The encapsulation layer 400 may be disposed on the display element layer 300. Since the display element 310 may be easily damaged by external moisture, oxygen, or the like, the encapsulation layer 400 may cover and protect the display element 310. The encapsulation layer 400 may include a first inorganic encapsulation layer 410, an organic encapsulation layer 420, and a second inorganic encapsulation layer 430 as shown in FIG. 9.

The first inorganic encapsulation layer 410 may cover the counter electrode 313, and may include silicon oxide, silicon nitride, and/or silicon oxynitride. In some embodiments, other layers such as a capping layer may be interposed between the first inorganic encapsulation layer 410 and the counter electrode 313. Since the first inorganic encapsulation layer 410 is formed along a lower structure, a top surface of the first inorganic encapsulation layer 410 is not flat as shown in FIG. 9. The organic encapsulation layer 420 covers the first inorganic encapsulation layer 410, and unlike the first inorganic encapsulation layer 410, the organic encapsulation layer 420 may have a substantially flat top surface. In an embodiment, the organic encapsulation layer 420 may include at least one material selected from the group consisting of polyethylene terephthalate, polyethylene naphthalate, polycarbonate, polyimide, polyethylene sulfonate, polyoxymethylene, polyarylate, and hexamethyl-disiloxane. The second inorganic encapsulation layer 430 may cover the organic encapsulation layer 420, and may include silicon oxide, silicon nitride, and/or silicon oxynitride.

Since the encapsulation layer 400 includes the first inorganic encapsulation layer 410, the organic encapsulation layer 420, and the second inorganic encapsulation layer 430, even when cracks occur in the encapsulation layer 400, due to the multi-layer structure, the cracks may not be connected between the first inorganic encapsulation layer 410 and the organic encapsulation layer 420 or between the organic encapsulation layer 420 and the second inorganic encapsulation layer 430. Accordingly, the formation of a path through which external moisture or oxygen penetrates into the display panel 10 may be prevented or minimized.

The upper organic layer 20 may be disposed on the display panel 10. The upper organic layer 20 may be disposed to cover a top surface of the display panel 10. The upper organic layer 20 may protect the top surface of the display panel 10.

The upper organic layer 20 may have a high transmittance to transmit light emitted from the display panel 10, and may have a relatively small thickness to reduce a weight of the display apparatus 1. Also, the upper organic layer 20 may have a relatively high strength and hardness to protect the display panel 10 from external impact. The upper organic layer 20 may protect the display panel 10 by being easily bent according to an external force without causing cracks or the like.

In an embodiment, a protective film may be disposed under the display panel 10 to face a bottom surface of the display panel 10 (in the −z direction). The protective film may be disposed under the substrate 100 to face a bottom surface of the substrate 100 (in the −z direction). The protective film may protect the display panel 10 during a process of manufacturing the display apparatus. An adhesive layer may be interposed between the protective film and the substrate 100, and the protective film may be attached to the bottom of the substrate 100 due to the adhesive layer. In this embodiment, the adhesive layer between the protective film and the substrate 100 may include at least one of an optically clear resin (OCR), an optically clear adhesive (OCA), and a pressure-sensitive adhesive (PSA).

Although only the display apparatus 1 has been described, the disclosure is not necessarily limited thereto. A method of manufacturing the display apparatus may also fall within the scope of the disclosure. A method of manufacturing the display apparatus 1 will now be described.

FIGS. 10 to 13 are views for describing a method of manufacturing a display apparatus, according to embodiments. In detail, FIGS. 10 to 13 are cross-sectional views schematically illustrating a process of forming the upper organic layer 20 including the first organic layer 21 and the second organic layer 22 from among processes of manufacturing the display apparatus 1.

Figure 10:
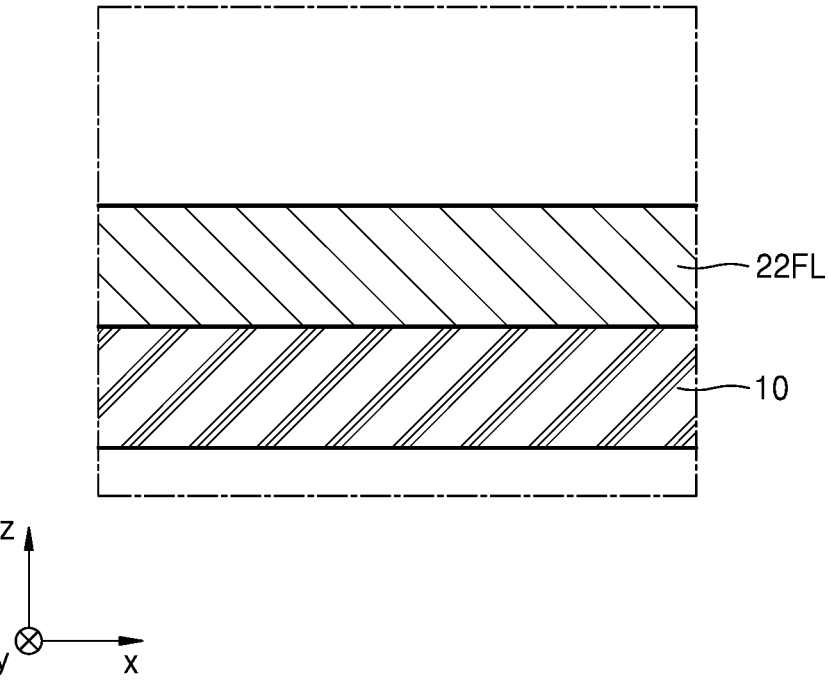
FIGS. 10 to 13 are cross-sectional views for describing a method of manufacturing a display apparatus, according to embodiments.

First, as shown in FIG. 10, a second organic layer forming layer 22FL may be formed on (e.g., formed directly thereon in the z direction) the display panel 10. The term "second organic layer" forming layer used herein may refer to a layer to which ultraviolet rays are not irradiated after a second organic layer composition is applied. In an embodiment, the second organic layer composition may include a urethane-based compound. For example, the second organic layer composition may include polyurethane. The second organic layer composition may further include a photocuring agent. The photocuring agent may include any material that may be generally used to photocure a urethane-based compound, and is not particularly limited. Also, the second organic layer composition may further include a solvent. For example, the second organic layer composition may be a solution in which a urethane-based compound and a photocuring agent are dissolved in a solvent.

The second organic layer composition may be applied to the display panel 10. Accordingly, the second organic layer forming layer 22FL may be formed. The second organic layer composition may be applied to the display panel 10 by using any of various methods. For example, in an embodiment the second organic layer composition may be applied to an entire surface of the display panel 10 by using inkjet equipment. Alternatively, the second organic layer composition may be coated on the display panel 10 by using dip coating. In an embodiment, at least a portion of the solvent may be removed by heat-treating the applied second organic layer composition.

Figure 11:
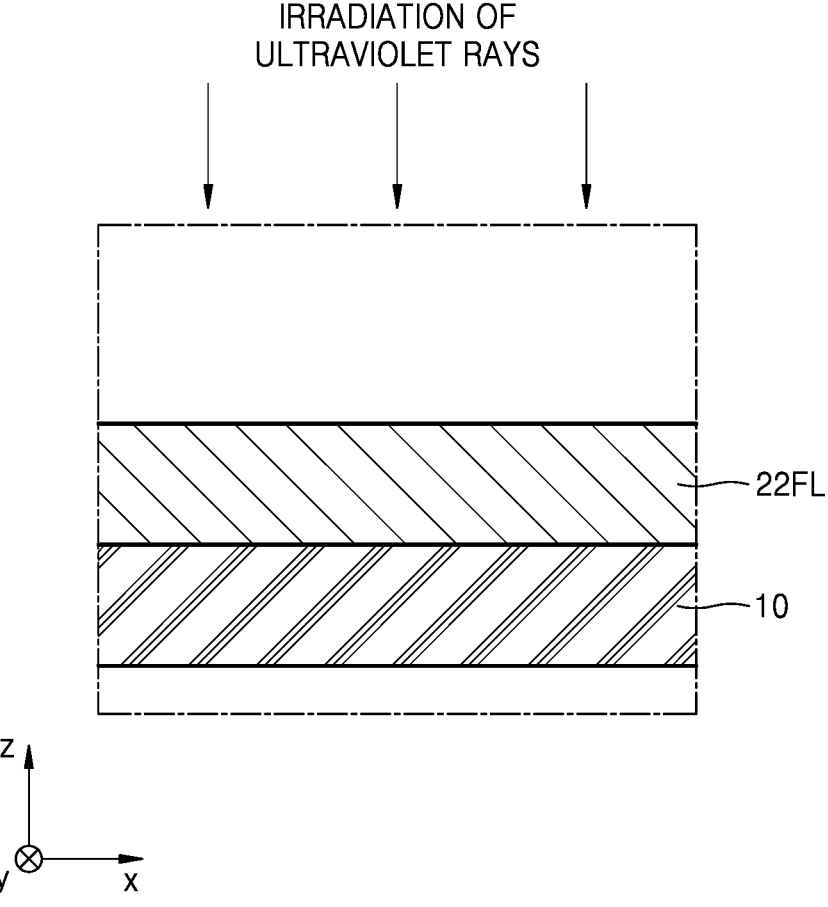

Next, as shown in FIG. 11, ultraviolet rays may be irradiated to the second organic layer forming layer 22FL. Accordingly, the second organic layer 22 may be formed. In an embodiment, ultraviolet rays having a light amount in a range of about 100 mJ/cm 2 to about 1000 mJ/cm 2 may be irradiated to the second organic layer forming layer 22FL.

For photocuring, ultraviolet rays with a wavelength of about 300 nm to about 400 nm may be used. An LED or metal halide may be used as an ultraviolet source.

Figure 12:
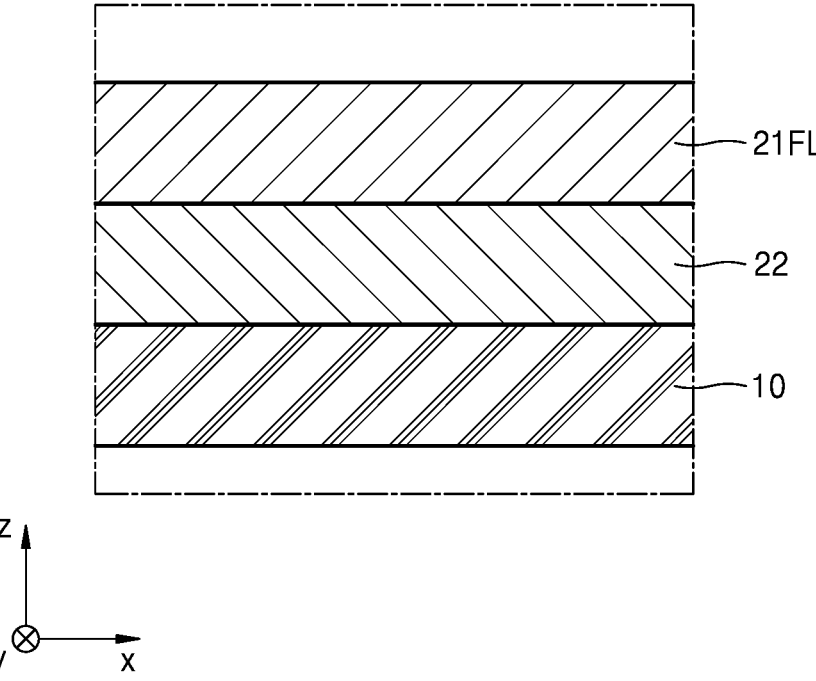

Next, as shown in FIG. 12, a first organic layer forming layer 21FL may be formed on (e.g., formed directly thereon in the z direction) the second organic layer 22. The term "first organic layer forming layer" used herein may refer to a layer to which ultraviolet rays are not irradiated after a first organic layer composition is applied. In an embodiment, the first organic layer composition may include at least one of an acrylic compound, a siloxane-based compound, and a carbonate-based compound. For example, the first organic layer composition may include at least one of polyacrylate, polydimethylsiloxane, and polycarbonate. The first organic layer composition may further include a photocuring agent. The photocuring agent may include any material that may be generally used to photocure an acrylic compound, a siloxane-based compound, or a carbonate-based compound. Also, the first organic layer composition may further include a solvent. For example, the first organic layer composition may be a solution in which at least one of an acrylic compound, a siloxane-based compound, and a carbonate-based compound and a photocuring agent are dissolved in a solvent.

The first organic layer composition may be applied to the second organic layer 22. Accordingly, the first organic layer forming layer 21FL may be formed. The first organic layer composition may be applied to the display panel 10 by using any of various methods. For example, in an embodiment the first organic layer composition may be applied to an entire surface of the display panel 10 by using inkjet equipment. Alternatively, the first organic layer composition may be coated on the display panel 10 by using dip coating. In an embodiment, at least a portion of the solvent may be removed by heat-treating the applied first organic layer composition.

Figure 13:
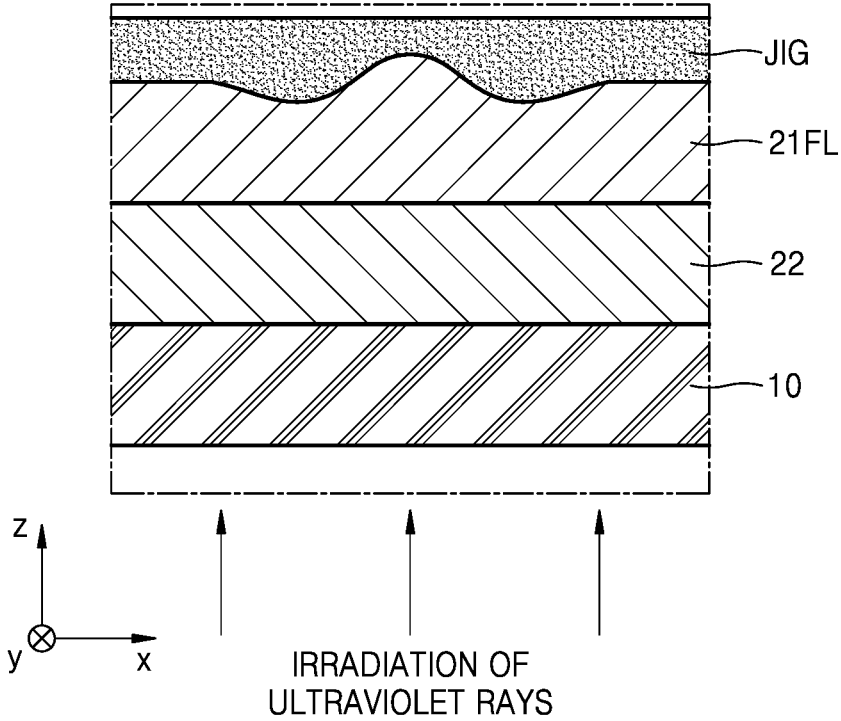

Next, as shown in FIG. 13, in an embodiment ultraviolet rays may be irradiated to the first organic layer forming layer 21FL, while pressing the first organic layer forming layer 21FL by using a jig JIG. As the first organic layer forming layer 21FL is pressed with the jig JIG, a top surface of the first organic layer forming layer 21FL may have a shape engaged with a bottom surface of the jig JIG. Accordingly, a top surface of the first organic layer 21 formed by curing the first organic layer forming layer 21FL may have a shape engaged with the bottom surface of the jig JIG.

The bottom surface of the jig JIG may be entirely flat. However, a portion of the first organic layer forming layer 21FL corresponding to the first organic foldable portion 21F may be curved based on the inclusion on the bottom surface of the jig JIG of one portion that is recessed in a direction (e.g., the +z direction) away from the display panel 10 and other portions located on both sides of the one portion and protruding in a direction towards the display panel 10. A top surface of the jig JIG may be substantially flat as shown in FIG. 13. However, embodiments of the present disclosure are not necessarily limited thereto. For example, the top surface of the jig JIG may have a shape similar to that of the bottom surface of the jig JIG.

In an embodiment, the bottom surface of the jig JIG may be non-adhesive. For example, in an embodiment the entire bottom surface of the jig JIG may be coated with a fluorinated compound. Accordingly, even when ultraviolet rays are irradiated to the first organic layer forming layer 21FL in a state where the bottom surface of the jig JIG contacts the top surface of the first organic layer forming layer 21FL, the first organic layer 21 may not be attached to the jig JIG. For example, in an embodiment the fluorinated compound may include at least one of polytetrafluoroethylene (PTFE) and polyvinylidene fluoride (PVDF).

The first organic layer forming layer 21FL may be deformed by being pressed by an external force (e.g., a compressive force), to have a predetermined flat surface and a curved surface. For example, when pressure is applied to the jig JIG in a direction towards the display panel 10, the top surface of the first organic layer forming layer 21FL may be in close contact with the bottom surface of the jig JIG, so that a top surface of the first organic layer forming layer 21FL is deformed to conform to a shape of the bottom surface of the jig JIG. The top surface of the first organic layer forming layer 21FL may have a shape engaged with the bottom surface of the jig JIG.

Ultraviolet rays may be irradiated to the first organic layer forming layer 21FL. The ultraviolet rays may be irradiated while the first organic layer forming layer 21FL is pressed with the jig JIG. In an embodiment, ultraviolet rays having a light amount in a range of about 100 mJ/cm 2 to about 1000 mJ/cm 2 may be irradiated to the first organic layer forming layer 21FL. For photocuring, ultraviolet rays with a wavelength of about 300 nm to about 400 nm may be used. An LED or metal halide may be used as an ultraviolet source.

Through this process, as described with reference to FIG. 4A, the first organic layer 21 may have a thickness that varies according to a position. For example, a thickness of the 1-1$^{st}$ foldable portion 21F1 may be greater than a thickness of the 1-1$^{st}$ non-folding portion 21NF1, and a thickness of the 1-2$^{nd}$ foldable portion 21F2 may be less than a thickness of the 1-1$^{st}$ non-folding portion 21NF1. Accordingly, the upper organic layer 20 including the first organic layer 21 and the second organic layer 22 may have a thickness that varies according to a position. A thickness of the first foldable portion 20F1 may be greater than a thickness of the first non-folding portion 20NF1, and a thickness of the second foldable portion 20F2 may be less than a thickness of the first non-folding portion 20NF1.

Figure 14:
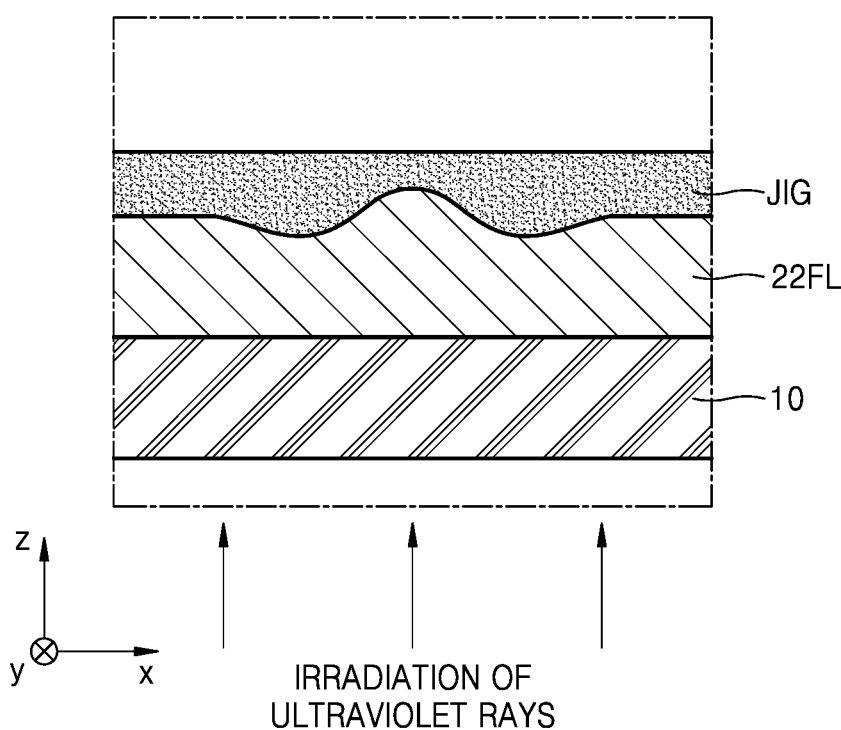
FIGS. 14 to 16 are views for describing a method of manufacturing a display apparatus, according to embodiments.
Figure 15:
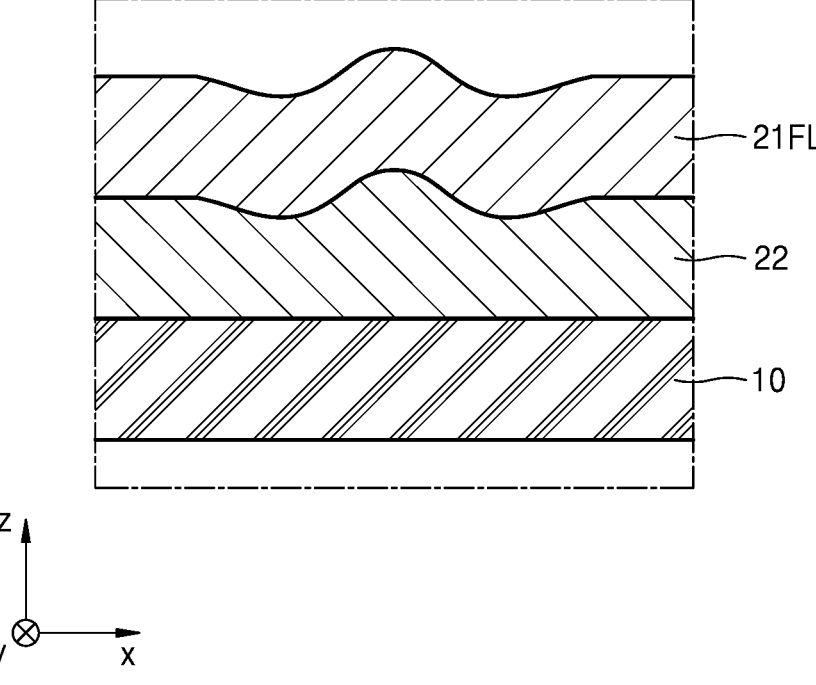
Figure 16:
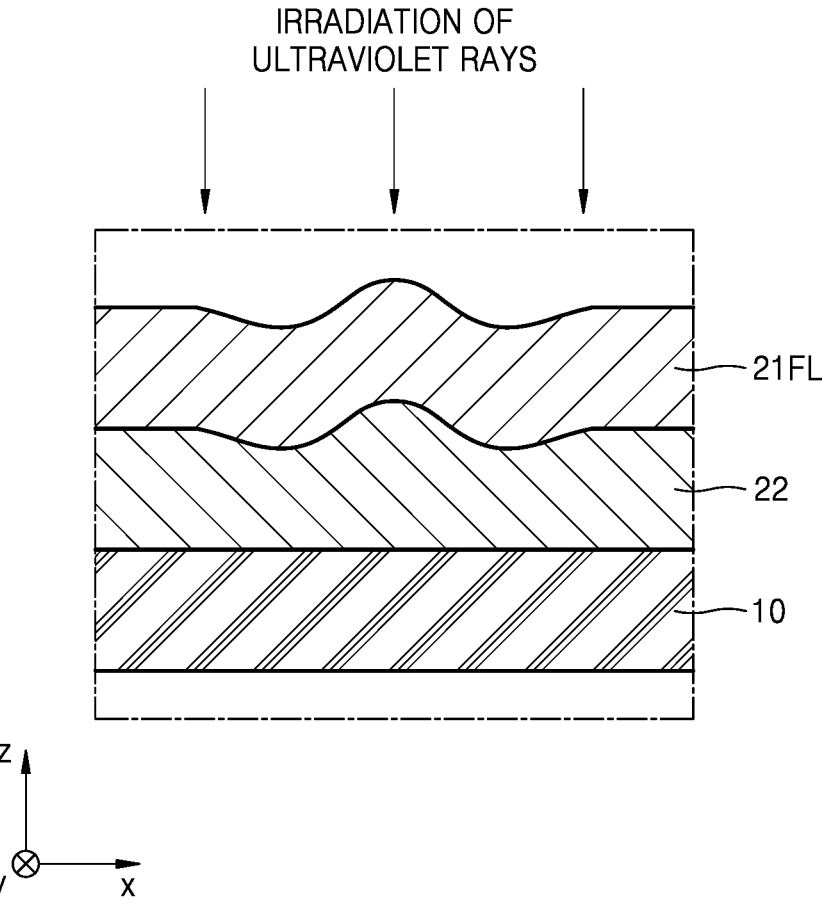

FIGS. 14 to 16 are views for describing a method of manufacturing a display apparatus, according to an embodiment. The method of FIGS. 14 to 16 corresponds to a modification of the method of manufacturing a display apparatus described with reference to FIGS. 10 to 13, and thus, the following will focus on a difference from the method of manufacturing a display apparatus described with reference to FIGS. 10 to 13.

Even in the method of manufacturing a display apparatus according to an embodiment, the second organic layer forming layer 22FL may be formed on the display panel 10. The process is the same as the method of manufacturing a display apparatus described with reference to FIGS. 10 to 13, and thus a repeated description may be omitted for economy of description.

However, in the method of manufacturing a display apparatus according to an embodiment, as shown in FIG. 14, ultraviolet rays may be irradiated to the second organic layer forming layer 22FL while pressing the second organic layer forming layer 22FL by using the jig JIG. As the second organic layer forming layer 22FL is pressed with the jig JIG, a top surface of the second organic layer forming layer 22FL may have a shape engaged with a bottom surface of the jig JIG. Accordingly, a top surface of the second organic layer 22 formed by curing the second organic layer forming layer 22FL may have a shape engaged with the bottom surface of the jig JIG.

The description of the jig JIG used to press the first organic layer forming layer 21FL may be applied to the jig JIG used to press the second organic layer forming layer 22FL, and thus a repeated description will be omitted for economy of description.

The second organic layer forming layer 22FL may be deformed by being pressed by an external force (e.g., a compressive force), to have a preset flat surface and a curved surface. For example, when pressure is applied to the jig JIG in a direction towards the display panel 10, the top surface of the second organic layer forming layer 22FL may be in close contact with the bottom surface of the jig JIG, so that the top surface of the second organic layer forming layer 22FL is deformed to conform to a shape of the bottom surface of the jig JIG. The top surface of the second organic layer forming layer 22FL may have a shape engaged with the bottom surface of the jig JIG. Ultraviolet rays may be irradiated to the second organic layer forming layer 22FL.

Through this process, as described with reference to FIG. 5A, the second organic layer 22 may have a thickness that varies according to a position. In an embodiment, a thickness of the $2\text{-}1^{st}$ foldable portion 22F1 may be greater than a thickness of the $2\text{-}1^{st}$ non-folding portion 22NF1, and a thickness of the $2\text{-}2^{nd}$ foldable portion 22F2 may be less than a thickness of the $2\text{-}1^{st}$ non-folding portion 22NF1.

Next, as shown in FIG. 15, the first organic layer forming layer 21FL may be formed on (e.g., formed directly thereon in the z direction) the second organic layer 22. Since the first organic layer forming layer 21FL is formed along the second organic layer under the first organic layer forming layer 21FL, a top surface of the first organic layer forming layer 21FL may have a shape engaged with the bottom surface of the jig JIG as shown in FIG. 15.

Next, as shown in FIG. 16, ultraviolet rays may be irradiated to the first organic layer forming layer 21FL. Accordingly, as described with reference to FIG. 5A, the upper organic layer 20 including the first organic layer 21 and the second organic layer 22 may have a thickness that varies according to a position. In an embodiment, a thickness of the first foldable portion 20F1 may be greater than a thickness of the first non-folding portion 20NF1, and a thickness of the second foldable portion 20F2 may be less than a thickness of the first non-folding portion 20NF1.

As described above, according to an embodiment, a display apparatus for increasing a flatness of a display surface may be provided. However, the scope of the disclosure is not limited by these effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope of the present disclosure.

What is claimed is:

1. A display apparatus comprising:
   a display panel comprising a display element; and
      an upper organic layer disposed over the display panel, the upper organic layer comprising a first organic layer and a second organic layer interposed between the first organic layer and the display panel in a thickness direction of the display apparatus,
   wherein the upper organic layer comprises:
      a first non-folding portion and a second non-folding portion that are spaced apart from each other in a first direction;
      a first foldable portion disposed between the first non-folding portion and the second non-folding portion, the first foldable portion extending in a second direction intersecting the first direction, the first foldable portion, at its thickest region, having a total thickness in the thickness direction of the display apparatus greater than a total thickness of each of the first and second non-folding portions in the thickness direction of the display apparatus, and
      a plurality of second foldable portions disposed on both sides of the first foldable portion, each of the plurality of second foldable portions extending in the second direction, and having a thickness in the thickness direction of the display apparatus less than the thicknesses of the first and second non-folding portions in the thickness direction of the display apparatus.

2. The display apparatus of claim 1, wherein:
   a thickness of the first foldable portion in the thickness direction of the display apparatus increases away from an outer portion of the first foldable portion towards a central portion of the first foldable portion; and
      a thickness of each of the plurality of second foldable portions in the thickness direction of the display apparatus decreases away from an outer portion of each of the plurality of second foldable portions towards a central portion of each of the plurality of second foldable portions.

3. The display apparatus of claim 1, wherein:
   a thickness of the first foldable portion in the thickness direction of the display apparatus increases away from each of the plurality of second foldable portions;
      a thickness of a portion of the second foldable portion in the thickness direction of the display apparatus decreases away from the first foldable portion;
      a thickness in the thickness direction of the display apparatus of a first portion of the plurality of second foldable portions positioned between the first foldable portion and the first non-folding portion decreases away from the first non-folding portion; and
      a thickness in the thickness direction of the display apparatus of a second portion of the plurality of second foldable portions positioned between the first foldable portion and the second non-folding portion decreases away from the second non-folding portion.

4. The display apparatus of claim 1, wherein:
   the first non-folding portion comprises a $1\text{-}1^{st}$ non-folding portion that is a portion of the first organic layer and a $2\text{-}1^{st}$ non-folding portion that is a portion of the second organic layer;
   the second non-folding portion comprises a $1\text{-}2^{nd}$ non-folding portion that is a portion of the first organic layer and a $2\text{-}2^{nd}$ non-folding portion that is a portion of the second organic layer;
   the first foldable portion comprises a $1\text{-}1^{st}$ foldable portion that is a portion of the first organic layer and a $2\text{-}1^{st}$ foldable portion that is a portion of the second organic layer; and
   each of the plurality of second foldable portions comprises a $1\text{-}2^{nd}$ foldable portion that is a portion of the first organic layer and a $2\text{-}2^{nd}$ foldable portion that is a portion of the second organic layer.

5. The display apparatus of claim 4, wherein:

the second organic layer has a uniform thickness;

a thickness of the 1-1$^{st}$ foldable portion in the thickness direction of the display apparatus is greater than a thickness of the 1-1$^{st}$ non-folding portion in the thickness direction of the display apparatus; and a thickness of the 1-2$^{nd}$ foldable portion in the thickness direction of the display apparatus is less than a thickness of the 1-1$^{st}$ non-folding portion in the thickness direction of the display apparatus.

6. The display apparatus of claim 5, wherein:

a thickness of the 1-1$^{st}$ foldable portion in the thickness direction of the display apparatus increases away from an outer portion of the 1-1$^{st}$ foldable portion towards a central portion of the 1-1$^{st}$ foldable portion; and a thickness of the 1-2$^{nd}$ foldable portion in the thickness direction of the display apparatus decreases away from an outer portion of the 1-2$^{nd}$ foldable portion towards a central portion of the 1-2$^{nd}$ foldable portion.

7. The display apparatus of claim 5, wherein:

a thickness of the 1-1$^{st}$ foldable portion in the thickness direction of the display apparatus increases away from the 1-2$^{nd}$ foldable portion;

a thickness of a portion of the 1-2$^{nd}$ foldable portion in the thickness direction of the display apparatus decreases away from the 1-1$^{st}$ foldable portion, a thickness in the thickness direction of the display apparatus of a first portion of the 1-2$^{nd}$ foldable portion positioned between the 1-1$^{st}$ non-folding portion and the 1-1$^{st}$ foldable portion decreases away from the 1-1$^{st}$ non-folding portion, and a thickness in the thickness direction of the display apparatus of a second portion of the 1-2$^{nd}$ foldable portion positioned between the 1-2$^{nd}$ non-folding portion and the 1-1$^{st}$ foldable portion decreases away from the 1-2$^{nd}$ non-folding portion.

8. The display apparatus of claim 4, wherein:

the first organic layer has a uniform thickness in the thickness direction of the display apparatus;

a thickness of the 2-1$^{st}$ foldable portion in the thickness direction of the display apparatus is greater than a thickness of the 2-1$^{st}$ non-folding portion in the thickness direction of the display apparatus; and a thickness of the 2-2$^{nd}$ foldable portion in the thickness direction of the display apparatus is less than thicknesses of the 2-1$^{st}$ non-folding portion and the 2-2$^{nd}$ non-folding portion in the thickness direction of the display apparatus.

9. The display apparatus of claim 8, wherein:

a thickness of the 2-1$^{st}$ foldable portion in the thickness direction of the display apparatus increases from an outer portion of the 2-1$^{st}$ foldable portion towards a central portion of the 2-1$^{st}$ foldable portion; and a thickness of the 2-2$^{nd}$ foldable portion in the thickness direction of the display apparatus decreases away from an outer portion of the 2-2$^{nd}$ foldable portion towards a central portion of the 2-2$^{nd}$ foldable portion.

10. The display apparatus of claim 8, wherein:

a thickness of the 2-1$^{st}$ foldable portion in the thickness direction of the display apparatus increases away from the 2-2$^{nd}$ foldable portion;

a thickness of a portion of the 2-2$^{nd}$ foldable portion in the thickness direction of the display apparatus decreases away from the 2-1$^{st}$ foldable portion;

a thickness in the thickness direction of the display apparatus of a first portion of the 2-2$^{nd}$ foldable portion positioned between the 2-1$^{st}$ foldable portion and the 2-1$^{st}$ non-folding portion decreases away from the 2-1$^{st}$ non-folding portion; and a thickness in the thickness direction of the display apparatus of a second portion of the 2-2$^{nd}$ foldable portion positioned between the 2-1$^{st}$ foldable portion and the 2-2$^{nd}$ non-folding portion decreases away from the 2-2$^{nd}$ non-folding portion.

11. The display apparatus of claim 4, wherein:

a first sum of a thickness of the 1-1$^{st}$ foldable portion in the thickness direction of the display apparatus and a thickness of the 2-1$^{st}$ foldable portion in the thickness direction of the display apparatus is greater than a second sum of a thickness of the 1-1$^{st}$ non-folding portion in the thickness direction of the display apparatus and a thickness of the 2-1$^{st}$ non-folding portion in the thickness direction of the display apparatus; and a third sum of a thickness of the 1-2$^{nd}$ foldable portion in the thickness direction of the display apparatus and a thickness of the 2-2$^{nd}$ foldable portion in the thickness direction of the display apparatus is less than the second sum.

12. The display apparatus of claim 1, wherein the first organic layer has a modulus that is higher than a modulus of the second organic layer.

13. The display apparatus of claim 12, wherein:

the modulus of the first organic layer is greater than or equal to about 1 GPa and less than about 10 GPa; and the modulus of the second organic layer is greater than or equal to about 0.1 GPa and less than about 1 GPa.

14. An electronic device comprising:

a display apparatus comprising:

a display panel comprising a display element; and an upper organic layer disposed over the display panel, the upper organic layer comprising a first organic layer and a second organic layer interposed between the first organic layer and the display panel in a thickness direction of the display apparatus, wherein the upper organic layer comprises:

a first non-folding portion and a second non-folding portion that are spaced apart from each other in a first direction;

a first foldable portion disposed between the first non-folding portion and the second non-folding portion, the first foldable portion extending in a second direction intersecting the first direction, the first foldable portion, at its thickest region, having a total thickness in the thickness direction of the display apparatus greater than a total thickness of each of the first and second non-folding portions in the thickness direction of the display apparatus; and a plurality of second foldable portions disposed on both sides of the first foldable portion, each of the plurality of second foldable portions extending in the second direction, and having a thickness in the thickness direction of the display apparatus less than the thicknesses of the first and second non-folding portions in the thickness direction of the display apparatus.

* * * * *